US011708542B2

(12) United States Patent
Sivik et al.

(10) Patent No.: US 11,708,542 B2
(45) Date of Patent: *Jul. 25, 2023

(54) PRODUCT COMPRISING POLYSACCHARIDE DERIVATIVES

(71) Applicant: The Procter & Gamble Company, Cincinnati, OH (US)

(72) Inventors: Mark Robert Sivik, Mason, OH (US); Zhengzheng Huang, Hockessin, DE (US); Helen S. M. Lu, Wallingford, PA (US); Rakesh Nambiar, West Chester, PA (US); Jayme L. Paullin, Claymont, DE (US)

(73) Assignee: The Procter & Gamble Company, Cincinnati, OH (US)

( * ) Notice: Subject to any disclaimer, the term of this patent is extended or adjusted under 35 U.S.C. 154(b) by 13 days.

This patent is subject to a terminal disclaimer.

(21) Appl. No.: 16/445,613

(22) Filed: Jun. 19, 2019

(65) Prior Publication Data
US 2019/0390138 A1 Dec. 26, 2019

Related U.S. Application Data

(60) Provisional application No. 62/687,287, filed on Jun. 20, 2018.

(51) Int. Cl.
C08B 37/00 (2006.01)
C11D 3/22 (2006.01)
C08L 5/04 (2006.01)
C11D 1/26 (2006.01)
C11D 3/00 (2006.01)
C11D 3/386 (2006.01)
C11D 11/00 (2006.01)
C11D 17/04 (2006.01)

(52) U.S. Cl.
CPC ............ C11D 1/26 (2013.01); C08B 37/0009 (2013.01); C08L 5/04 (2013.01); C11D 3/0015 (2013.01); C11D 3/228 (2013.01); C11D 3/38618 (2013.01); C11D 3/38627 (2013.01); C11D 3/38645 (2013.01); C11D 11/0017 (2013.01); C11D 17/043 (2013.01)

(58) Field of Classification Search
CPC ..... C08B 37/0024; C08B 35/02; C08B 33/02; C08B 31/06; C08B 31/063; C08B 37/0009
See application file for complete search history.

(56) References Cited

U.S. PATENT DOCUMENTS

| 5,108,644 | A | 4/1992 | Machin |
| 5,352,604 | A | 10/1994 | Wilson |
| 5,750,489 | A | 5/1998 | Garcia |
| 6,498,136 | B2 | 12/2002 | Rodrigues |
| 7,459,423 | B2 | 12/2008 | Blyth |
| 8,349,789 | B2 | 1/2013 | Lant |
| 8,585,784 | B2 | 11/2013 | Kramer |
| 8,785,171 | B2 | 7/2014 | Souter |
| 8,888,865 | B2 | 11/2014 | Miracle |
| 8,901,065 | B2 | 12/2014 | Tantawy |
| 9,404,070 | B2 | 8/2016 | Lant |
| 11,066,626 | B2* | 7/2021 | Huang ............... C11D 3/38645 |
| 11,584,901 | B2* | 2/2023 | Huang ...................... B08B 3/10 |
| 2006/0189501 | A1 | 8/2006 | Lant |
| 2007/0225191 | A1* | 9/2007 | Scheibel ............... C08B 31/063 510/357 |
| 2008/0193999 | A1 | 8/2008 | Andersen |
| 2009/0209661 | A1 | 8/2009 | Somerville |
| 2009/0325846 | A1 | 12/2009 | Tantawy |
| 2010/0022431 | A1 | 1/2010 | Lant |
| 2010/0215047 | A1 | 8/2010 | Filsfils |
| 2012/0258507 | A1 | 10/2012 | Adams |
| 2013/0256182 | A1* | 10/2013 | Petrovicova ........... B65D 65/46 206/524.7 |
| 2013/0260438 | A1 | 10/2013 | Alekseyev |
| 2014/0187468 | A1 | 7/2014 | Estell |
| 2015/0132831 | A1 | 5/2015 | Olinski |
| 2015/0291918 | A1 | 10/2015 | Miracle |
| 2016/0319266 | A1 | 11/2016 | Kolkman |
| 2017/0044468 | A1 | 2/2017 | Gori |
| 2018/0002642 | A1 | 1/2018 | Kolkman |
| 2018/0105772 | A1 | 4/2018 | Gori |
| 2018/0112156 | A1 | 4/2018 | Gori |
| 2018/0237761 | A1 | 8/2018 | Babe et al. |

(Continued)

FOREIGN PATENT DOCUMENTS

CN 101171327 A 4/2008
CN 101421307 A 4/2009
(Continued)

OTHER PUBLICATIONS

U.S. Appl. No. 16/973,324, filed Dec. 2020, Huang et al.*
Unursaikhan et al., "Antitumor Activities of O-Sulfonated Derivatives of (1,3)-alpha-D-Glucan from Different Lentinus edodes" Bioscii Biotechnol Biochem vol. 70 No. 1 pp. 38-46 (Year: 2006).*
Material safety data sheed forsodioum dextran sulfate, published by ThermoFisher Scientific (Year: 2010).*
U.S. Appl. No. 16/439,728, filed Jun. 13, 2019, Frits Goedegebuur.
U.S. Appl. No. 16/439,731, filed Jun. 13, 2019, Frits Goedegebuur.
PCT Search Report for appl. No. PCT/US2019/036888, dated Aug. 30, 2019, 17 pages.
PCT Search Report for appl. No. PCT/US2019/036889, dated Aug. 30, 2019, 15 pages.
PCT Search Report for appl. No. PCT/US2019/037856, dated Sep. 3, 2019, 13 pages.

Primary Examiner — Eric Olson

(57) ABSTRACT

The disclosure relates to products including a polysaccharide derivative wherein the polysaccharide derivative includes a polysaccharide substituted with at least one of: a) at least one sulfate group; b) at least one sulfonate group; c) at least one thiosulfate group; or d) a combination thereof; wherein the polysaccharide is poly alpha-1,3-glucan, poly alpha-1,6-glucan, poly alpha-1,3-1,6-glucan, or a mixture thereof; and the polysaccharide derivative has a degree of substitution of about 0.001 to about 3. The products can be useful as anti-deposition and/or anti-graying agents in laundry detergents, and in home care applications.

14 Claims, No Drawings

(56) References Cited

U.S. PATENT DOCUMENTS

| | | |
|---|---|---|
| 2019/0093055 A1 | 3/2019 | Gori |
| 2019/0194636 A1 | 6/2019 | Babe |
| 2020/0002646 A1* | 1/2020 | Huang ................ C11D 3/0036 |
| 2021/0253977 A1* | 8/2021 | Huang .................. C11D 3/228 |
| 2021/0388289 A1* | 12/2021 | Sivik .................. C11D 11/0029 |
| 2021/0395648 A1* | 12/2021 | Sivik ...................... C11D 3/386 |
| 2022/0056375 A1* | 2/2022 | Huang ............... C11D 3/38618 |

FOREIGN PATENT DOCUMENTS

| | | | |
|---|---|---|---|
| CN | 110382553 A | 10/2019 | |
| CN | 111196863 A | 5/2020 | |
| EP | 1038945 A2 | 9/2000 | |
| GB | 2127462 A | 4/1984 | |
| WO | WO2008087497 A1 | 7/2008 | |
| WO | WO2009158449 A1 | 12/2009 | |
| WO | WO2012134969 A1 | 10/2012 | |
| WO | WO2017014722 A1 | 1/2017 | |
| WO | WO2017218391 A1 | 12/2017 | |
| WO | WO2018/112187 * | 6/2018 | ......... C08B 37/0009 |
| WO | WO2018112187 A1 | 6/2018 | |
| WO | WO2018118917 A1 | 6/2018 | |
| WO | WO2018118950 A1 | 6/2018 | |
| WO | WO2019108599 A1 | 6/2019 | |

* cited by examiner

PRODUCT COMPRISING POLYSACCHARIDE DERIVATIVES

PARTIES TO A JOINT RESEARCH AGREEMENT

The Procter & Gamble Co. and Danisco US Inc. are parties to a joint research agreement.

FIELD OF THE DISCLOSURE

The present disclosure is directed towards a product comprising a polysaccharide derivative, wherein the polysaccharide derivative comprises a polysaccharide substituted with at least one sulfate group, at least one sulfonate group, at least one thiosulfate group, or a combination thereof.

BACKGROUND

Polysaccharides modified with functional groups capable of bearing charge (i.e. salts of cationic or anionic functional groups) are known. Such modified polysaccharides have been used to provide enhanced solubility in a variety of aqueous applications, for example as rheology modifiers, emulsion stabilizers, and dispersing agents in cleaning, detergent, cosmetics, food, cement, film, and paper production. In particular, carboxymethyl cellulose derivatives have been used as rheology modifiers. However, in some applications carboxymethyl cellulose derivatives can have decreased rheological stability. Sulfonated or sulfated derivatives can offer advantages over carboxylate derivatives due to their improved rheological stability to ionic strength and pH value. The higher stability of the sulfonated material is believed to be due to the low $pK_a$ value of the sulfonate group. Additionally, the sulfonate group can create a separated ion pair as compared to a carboxylate group, which may offer the benefit of less water hardness sensitivity. In addition, sulfonated or sulfated polysaccharides may have lower susceptibilities to complexing with multivalent ions. Sulfonated polysaccharides are useful in fabric care applications, for example as anti-deposition and/or antigraying agents in laundry detergents, and in home care applications.

Many of the ingredients that form a part of a detergent composition are produced from non-renewable petroleum feedstocks. There remains a need to formulate detergent compositions providing improved cleaning performance that are made from renewable resources.

SUMMARY

Disclosed herein are products comprising a polysaccharide derivative, wherein the polysaccharide derivative comprises a polysaccharide substituted with at least one of:
 a) at least one sulfate group;
 b) at least one sulfonate group;
 c) at least one thiosulfate group; or
 d) a combination thereof;
wherein the polysaccharide is poly alpha-1,3-glucan, poly alpha-1,6-glucan, poly alpha-1,3-1,6-glucan, or a mixture thereof, and the polysaccharide derivative has a degree of substitution of about 0.001 to about 3, and wherein the product is a fabric care product and/or a home care product.

In one embodiment, the polysaccharide is poly alpha-1,3-glucan, and the poly alpha-1,3-glucan comprises a backbone of glucose monomer units wherein greater than or equal to 50% of the glucose monomer units are linked via alpha-1,3-glycosidic linkages. In another embodiment, the poly alpha-1,3-glucan comprises a backbone of glucose monomer units wherein greater than or equal to 90% of the glucose monomer units are linked via alpha-1,3-glycosidic linkages. In a further embodiment, the polysaccharide is poly alpha-1,6-glucan, and the poly alpha-1,6-glucan comprises a backbone of glucose monomer units wherein greater than or equal to 40% of the glucose monomer units are linked via alpha-1,6-glycosodic linkages. In a different embodiment, the poly alpha-1,6-glucan has a degree of alpha-1,2-branching that is less than 50%. In yet another embodiment, the polysaccharide is poly alpha-1,3-1,6-glucan, wherein (i) at least 30% of the glycosidic linkages of the poly alpha-1,3-1,6-glucan are alpha-1,3 linkages, (ii) at least 30% of the glycosidic linkages of the poly alpha-1,3-1,6-glucan are alpha-1,6 linkages, (iii) the poly alpha-1,3-1,6-glucan has a weight average degree of polymerization ($DP_w$) of at least 10; and (iv) the alpha-1,3 linkages and alpha-1,6 linkages of the poly alpha-1,3-1,6-glucan do not consecutively alternate with each other.

In one embodiment, the at least one sulfate group is sulfate or an alkyl sulfate. In another embodiment, the at least one sulfonate group is an alkyl sulfonate. Suitable alkyl sulfonates include 1,3-propanesultone and/or 1,4-butanesultone. In an additional embodiment, the polysaccharide is substituted with at least one sulfate group and at least one sulfonate group. In a further embodiment, the polysaccharide is substituted with at least one sulfonate group and at least one thiosulfate group. In still another embodiment, the polysaccharide is substituted with at least one sulfate group, at least one sulfonate group, and at least one thiosulfate group.

In one embodiment, the polysaccharide derivative has a weight average degree of polymerization in the range of from about 5 to about 1400.

In another embodiment, the product is in the form of a liquid, a gel, a powder, a hydrocolloid, an aqueous solution, a granule, a tablet, a capsule, a single compartment sachet, a multi-compartment sachet, a single compartment pouch, or a multi-compartment pouch.

In yet another embodiment, the product further comprises at least one of a surfactant, an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil re-deposition agent, a dye, a bactericide, a tarnish inhibitor, an optical brightener, a perfume, a saturated or unsaturated fatty acid, a dye transfer inhibiting agent, a chelating agent, a hueing dye, a calcium cation, a magnesium cation, a visual signaling ingredient, an anti-foam, a structurant, a thickener, an anti-caking agent, a starch, sand, a gelling agent, or a combination thereof.

In one embodiment, the enzyme is a cellulase, a protease, an amylase, a lipase, or a combination thereof. In one embodiment, the enzyme is a cellulase. In another embodiment, the enzyme is a protease. In a further embodiment, the enzyme is an amylase. In yet another embodiment, the enzyme is a lipase.

In one embodiment the product is a liquid laundry detergent product, and the product comprises an anionic detersive surfactant. In one embodiment the product is a water-soluble unit dose laundry detergent product in the form of a water-soluble pouch, and the product comprises an anionic detersive surfactant. In one embodiment the product is a laundry powder detergent product, and the product comprises an anionic detersive surfactant. In one embodiment the product is a fabric enhancer product, and the product comprises a fabric-softening ingredient.

Also disclosed herein is a method for treating a substrate, the method comprising the steps:

A) providing a product comprising a polysaccharide derivative, wherein the polysaccharide derivative comprises a polysaccharide substituted with at least one of:
  a) at least one sulfate group;
  b) at least one sulfonate group;
  c) at least one thiosulfate group; or
  d) a combination thereof;

wherein the polysaccharide is poly alpha-1,3-glucan, poly alpha-1,6-glucan, poly alpha-1,3-1,6-glucan, or a mixture thereof, and the polysaccharide derivative has a degree of substitution of about 0.001 to about 3;

B) contacting the substrate with the product; and
C) optionally rinsing the substrate;

wherein the substrate is a textile, a fabric, carpet, upholstery, apparel, or a surface.

DETAILED DESCRIPTION

The disclosures of all cited patent and non-patent literature are incorporated herein by reference in their entirety.

As used herein, the term "embodiment" or "disclosure" is not meant to be limiting, but applies generally to any of the embodiments defined in the claims or described herein. These terms are used interchangeably herein.

In this disclosure, a number of terms and abbreviations are used. The following definitions apply unless specifically stated otherwise.

The articles "a", "an", and "the" preceding an element or component are intended to be nonrestrictive regarding the number of instances (i.e. occurrences) of the element or component. There "a", "an", and "the" should be read to include one or at least one, and the singular word form of the element or component also includes the plural unless the number is obviously meant to be singular.

The term "comprising" means the presence of the stated features, integers, steps, or components as referred to in the claims, but that it does not preclude the presence or addition of one or more other features, integers, steps, components, or groups thereof. The term "comprising" is intended to include embodiments encompassed by the terms "consisting essentially of" and "consisting of". Similarly, the term "consisting essentially of" is intended to include embodiments encompassed by the term "consisting of".

Where present, all ranges are inclusive and combinable. For example, when a range of "1 to 5" is recited, the recited range should be construed as including ranges "1 to 4", "1 to 3", 1-2", "1-2 and 4-5", "1-3 and 5", and the like.

As used herein in connection with a numerical value, the term "about" refers to a range of +/−0.5 of the numerical value, unless the term is otherwise specifically defined in context. For instance, the phrase a "pH value of about 6" refers to pH values of from 5.5 to 6.5, unless the pH value is specifically defined otherwise.

It is intended that every maximum numerical limitation given throughout this Specification includes every lower numerical limitation, as if such lower numerical limitations were expressly written herein. Every minimum numerical limitation given throughout this Specification will include every higher numerical limitation, as if such higher numerical limitations were expressly written herein. Every numerical range given throughout this Specification will include every narrower numerical range that falls within such broader numerical range, as if such narrower numerical ranges were all expressly written herein.

The features and advantages of the present disclosure will be more readily understood, by those of ordinary skill in the art from reading the following detailed description. It is to be appreciated that certain features of the disclosure, which are, for clarity, described above and below in the context of separate embodiments, may also be provided in combination in a single element. Conversely, various features of the disclosure that are, for brevity, described in the context of a single embodiment, may also be provided separately or in any sub-combination. In addition, references to the singular may also include the plural (for example, "a" and "an" may refer to one or more) unless the context specifically states otherwise.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

As used herein:

The terms "percent by weight", "weight percentage (wt %)" and "weight-weight percentage (% w/w)" are used interchangeably herein. Percent by weight refers to the percentage of a material on a mass basis as it is comprised in a composition, mixture or solution.

The term "water soluble" means that the polysaccharide or polysaccharide derivative is soluble at 1% by weight or higher in pH 7 water at 25° C. The percentage by weight is based on the total weight of the polysaccharide soluble in water, for example, 1 gram of polysaccharide in 100 grams of water.

As used herein, "weight average molecular weight" or "$M_w$" is calculated as $M_w = \Sigma N_i M_i^2 / \Sigma N_i M_i$; where $M_i$ is the molecular weight of a chain and $N_i$ is the number of chains of that molecular weight. The weight average molecular weight can be determined by technics such as static light scattering, gas chromatography (GC), high pressure liquid chromatography (HPLC), gel permeation chromatography (GPC), small angle neutron scattering, X-ray scattering, and sedimentation velocity.

As used herein, "number average molecular weight" or "$M_n$" refers to the statistical average molecular weight of all the polymer chains in a sample. The number average molecular weight is calculated as $M_n = \Sigma N_i M_i / \Sigma N_i$ where $M_i$ is the molecular weight of a chain and $N_i$ is the number of chains of that molecular weight. The number average molecular weight of a polymer can be determined by technics such as gel permeation chromatography, viscometry via the (Mark-Houwink equation), and colligative methods such as vapor pressure osmometry, end-group determination, or proton NMR.

Glucose carbon positions 1, 2, 3, 4, 5 and 6 as referred to herein are as known in the art and depicted in Structure I:

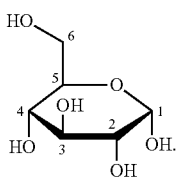

Structure I

The terms "glycosidic linkage" and "glycosidic bond" are used interchangeably herein and refer to the type of covalent bond that joins a carbohydrate (sugar) molecule to another group such as another carbohydrate. The term "alpha-1,6-glucosidic linkage" as used herein refers to the covalent bond that joins alpha-D-glucose molecules to each other through carbons 1 and 6 on adjacent alpha-D-glucose rings. The term "alpha-1,3-glucosidic linkage" as used herein refers to the covalent bond that joins alpha-D-glucose molecules to each other through carbons 1 and 3 on adjacent alpha-D-glucose rings. The term "alpha-1,2-glucosidic linkage" as used herein refers to the covalent bond that joins alpha-D-glucose molecules to each other through carbons 1 and 2 on adjacent alpha-D-glucose rings. The term "alpha-1,4-glucosidic linkage" as used herein refers to the covalent bond that joins alpha-D-glucose molecules to each other through carbons 1 and 4 on adjacent alpha-D-glucose rings. Herein, "alpha-D-glucose" will be referred to as "glucose".

The glycosidic linkage profile of a glucan, dextran, substituted glucan, or substituted dextran can be determined using any method known in the art. For example, a linkage profile can be determined using methods that use nuclear magnetic resonance (NMR) spectroscopy (e.g., $^{13}$C NMR or $^1$H NMR). These and other methods that can be used are disclosed in Food Carbohydrates: Chemistry, Physical Properties, and Applications (S. W. Cui, Ed., Chapter 3, S. W. Cui, Structural Analysis of Polysaccharides, Taylor & Francis Group LLC, Boca Raton, Fla., 2005), which is incorporated herein by reference.

The term "poly glucan", as used herein, refers to poly alpha-1,3-glucan, poly alpha-1,6-glucan, and/or poly alpha-1,3-1,6-glucan. The plural "poly glucans" refers to all three polysaccharides.

The term "alkyl group", as used herein, refers to linear, branched, or cyclic ("cycloalkyl") hydrocarbon groups containing no unsaturation. As used herein, the term "alkyl group" encompasses substituted alkyls, for example alkyl groups substituted with another alkyl group or with at least one hydroxyalkyl group or dihydroxy alkyl group. Examples of alkyl groups include methyl, ethyl, propyl, butyl, pentyl, isopropyl, iso-butyl, tert-butyl, sec-butyl groups.

As used herein, the term "alkene" refers to linear, branched, or cyclic hydrocarbon groups containing at least one carbon-carbon double bond. As used herein, the term "alkene" encompasses substituted alkene groups, for example alkenes substituted with at least one alkyl group, hydroxyalkyl group, or dihydroxy alkyl group, as well as alkenes containing one or more heteroatoms such as oxygen, sulfur, and/or nitrogen within the hydrocarbon chain.

As used herein, the term "alkyne" refers to linear and branched hydrocarbon groups containing at least one carbon-carbon triple bond and encompasses substituted alkyne groups, for example alkynes substituted with at least one alkyl group.

As used herein, the term "aryl" means an aromatic carbocyclic group having a single ring (e.g., phenyl), multiple rings (e.g., biphenyl), or multiple condensed rings in which at least one is aromatic, (e.g., 1,2,3,4-tetrahydronaphthyl, naphthyl, anthryl, or phenanthryl), which is optionally mono-, di-, or trisubstituted with alkyl groups.

The present disclosure is directed to a product comprising a polysaccharide derivative, wherein the polysaccharide derivative comprises a polysaccharide substituted with at least one of:
   a) at least one sulfate group;
   b) at least one sulfonate group;
   c) at least one thiosulfate group;
   d) or a combination thereof;
wherein the polysaccharide is poly alpha-1,3-glucan, poly alpha-1,6-glucan, poly alpha-1,3-1,6-glucan, or a mixture thereof; and the polysaccharide derivative has a degree of substitution of about 0.001 to about 3. The phrase "a combination thereof" means that the polysaccharide is substituted with at least one sulfate group and at least one sulfonate group, or with at least one sulfate group and at least one thiosulfate group, or at least one sulfonate group and at least one thiosulfate group, or with at least one sulfate group, at least one sulfonate group, and at least one thiosulfate group. The sulfate, sulfonate, and thiosulfate groups are ionizable and may exist in a neutral or ionic form as a solid or in a formulation or aqueous solution, depending on the pH at which the polysaccharide derivative is isolated or used.

In other embodiments, the product comprises a polysaccharide derivative, wherein the polysaccharide derivative consists essentially of, or consists of, a polysaccharide substituted with at least one of:
   a) at least one sulfate group;
   b) at least one sulfonate group;
   c) at least one thiosulfate group;
   d) or a combination thereof;
wherein the polysaccharide is poly alpha-1,3-glucan, poly alpha-1,6-glucan, poly alpha-1,3-1,6-glucan, or a mixture thereof; and the polysaccharide derivative has a degree of substitution of about 0.001 to about 3.

The polysaccharide derivatives disclosed herein are of interest due to their enhanced water solubility and viscosity stability under conditions of increased ionic strength and/or pH value. These characteristics can be useful in a wide range of applications, including laundry, cleaning, food, cosmetics, industrial, film, and paper production. Sulfonated, sulfated, and/or thiosulfated polysaccharides can be useful in fabric care applications, for example as anti-deposition and/or anti-graying agents in laundry detergents, and in home and personal care applications.

The polysaccharide derivatives disclosed herein can be comprised in a personal care product, pharmaceutical product, household product, or industrial product in an amount that provides a desired degree of one or more of the following physical properties to the product: thickening, freeze/thaw stability, lubricity, moisture retention and release, texture, consistency, shape retention, emulsification, binding, suspension, dispersion, and gelation, for example. Examples of a concentration or amount of a polysaccharide derivative as disclosed herein in a product, on a weight basis, can be about 0.1-3 wt %, 1-2 wt %, 1.5-2.5 wt %, 2.0 wt %, 0.1-4 wt %, 0.1-5 wt %, or 0.1-10 wt %, for example.

Suitable fabric and/or home care products includes products relating to treating fabrics, hard surfaces and any other surfaces in the area of fabric and home care, including: air care, car care, dishwashing, fabric conditioning (including softening), laundry detergency, laundry and rinse additive and/or care, hard surface cleaning and/or treatment, and other cleaning for consumer or institutional use.

In one embodiment, the polysaccharide derivative comprises a polysaccharide which has sulfate groups, sulfonate groups, thiosulfate groups, or a combination thereof randomly substituted along the polysaccharide backbone, such that the polysaccharide backbone comprises unsubstituted and substituted alpha-D-glucose rings. As used herein, the term "randomly substituted" means the substituents on the glucose rings in the randomly substituted polysaccharide occur in a non-repeating or random fashion. That is, the substitution on a substituted glucose ring may be the same or different [i.e. the substituents (which may be the same or different) on different atoms in the glucose rings in the polysaccharide] from the substitution on a second substituted glucose ring in the polysaccharide, such that the overall substitution on the polymer has no pattern. Further, the substituted glucose rings occur randomly within the polysaccharide (i.e., there is no pattern with the substituted and unsubstituted glucose rings within the polysaccharide).

The polysaccharide derivative comprises poly alpha-1,3-glucan, poly alpha-1,6-glucan, poly alpha-1,3-1,6-glucan substituted at one or more positions with at least one of: a) at least one sulfate group; b) at least one sulfonate group; c) at least one thiosulfate group; or d) a combination thereof; and wherein the polysaccharide derivative has a degree of substitution (DoS) of about 0.001 to about 3. The at least one sulfate, sulfonate, and/or thiosulfate group can each independently derivatize the polysaccharide at the 2, 3, 4, and/or 6 hydroxyl position of a glucose monomer, as appropriate for the specific polysaccharide.

Suitable sulfate groups include sulfate, a $C_1$ to $C_4$ alkyl sulfate, a $C_2$ to $C_4$ alkene sulfate, a $C_2$ to $C_4$ alkyne sulfate, a $C_6$ to $C_{12}$ aryl sulfate, and a combination thereof. The sulfate groups are independently linked to the polysaccharide through a chemical linkage such as sulfate (—$OSO_2OH$); an alkyl sulfate (-alkylene-$OSO_2OH$) where the alkyl moiety can contain from 1 to 4 carbon atoms; an alkene sulfate (-alkenyl-$OSO_2OH$) where the alkene moiety can contain from 2 to 4 carbon atoms; an alkyne sulfate (-alkynyl-$OSO_2OH$) where the alkyne moiety can contain from 2 to 4 carbon atoms, and an aryl sulfate (—Ar—$OSO_2OH$) where the aryl moiety Ar can contain from 6 to 12 carbon atoms. The sulfate groups are ionizable and may exist in a neutral or ionic form as a solid or in a formulation or aqueous solution, depending on the pH at which the polysaccharide derivative is isolated or used.

Suitable sulfonate groups include sulfonate, a $C_1$ to $C_4$ alkyl sulfonate, a $C_2$ to $C_4$ alkene sulfonate, a $C_6$ to $C_{12}$ aryl sulfonate, and a combination thereof. The sulfonate groups are independently linked to the polysaccharide through a chemical linkage such as sulfonate (—$SO_2OH$); an alkyl sulfonates (-alkylene-$SO_2OH$) where the alkylene moiety can contain from 1 to 4 carbon atoms; an alkene sulfonate (-alkenyl-$SO_2OH$) wherein the alkene moiety can contain from 2 to 4 carbon atoms; an alkyne sulfonate (-alkynyl-$SO_2OH$) where the alkyne moiety can contain from 2 to 4 carbon atoms; and an aryl sulfonate (—Ar—$SO_2OH$) where the aryl moiety Ar can contain from 6 to 12 carbon atoms. Examples of alkyl sulfonates include ethyl sulfonate, propyl sulfonate, and butyl sulfonate. The sulfonate groups are ionizable and may exist in a neutral or ionic form as a solid or in a formulation or aqueous solution, depending on the pH at which the polysaccharide derivative is isolated or used.

Suitable thiosulfate groups include thiosulfate (—$SSO_2OH$). The thiosulfate group is ionizable and may exist in a neutral or ionic form as a solid or in a formulation or aqueous solution, depending on the pH at which the polysaccharide derivative is isolated or used.

Structures II, III, and IV below show three embodiments representing derivatization of a poly-1,3-glucan glucose repeat unit or a poly-1,6-glucan glucose repeat unit with a sulfate, alkyl sulfonate, or thiosulfate group to show the possible substitution sites and the chemical linkages to the glucose repeat unit. The total number of sulfate, sulfonate, and/or thiosulfate groups present in a derivatized polysaccharide is reflected in the degree of substitution of the derivatized polysaccharide. Structures II, III, and IV are idealized representations in which the glucose repeat unit is fully substituted; the degree of substitution is shown as 3.

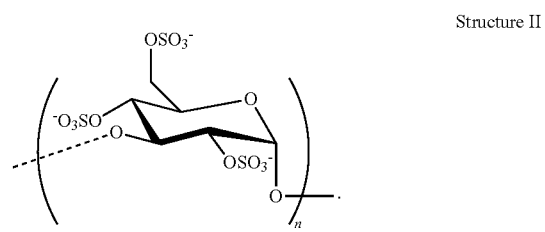

Structure II

Derivatization of a glucose unit within poly alpha-1,3-glucan with a sulfate group at each possible point of substitution.

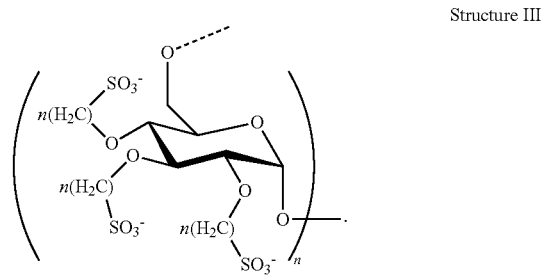

Structure III

Derivatization of a glucose unit within poly alpha-1,6-glucan with an alkyl sulfonate group at each possible point of substitution.

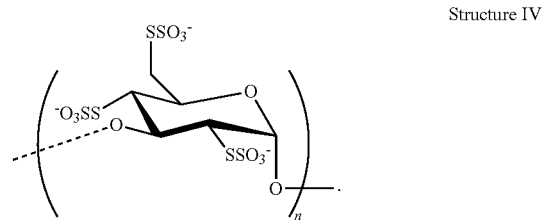

Structure IV

Derivatization of a glucose unit within poly alpha-1,3-glucan with a thiosulfate group at each possible point of substitution.

In one embodiment, the polysaccharide derivative comprises a polysaccharide substituted with at least one sulfate group, wherein the polysaccharide is poly alpha-1,3-glucan. In another embodiment, the polysaccharide derivative comprises a polysaccharide substituted with at least one sulfonate group, wherein the polysaccharide is poly alpha-1,3-glucan. In a further embodiment, the polysaccharide derivative comprises poly alpha-1,3-glucan substituted with at least one alkyl sulfonate group. In yet a further embodiment, the polysaccharide derivative comprises poly alpha-1,3-glucan substituted with at least one alkyl sulfonate group, wherein the alkyl sulfonate is ethyl sulfonate, propyl sulfonate, butyl sulfonate, or a combination thereof. In an additional embodiment, the polysaccharide derivative comprises a polysaccharide substituted with at least one thiosulfate group, wherein the polysaccharide is poly alpha-1,3-glucan. In a further embodiment, the polysaccharide derivative comprises a polysaccharide substituted with at least one sulfate group and at least one sulfonate group, wherein the polysaccharide is poly alpha-1,3-glucan. In yet a further embodiment, the polysaccharide derivative comprises a polysaccharide substituted with at least one sulfate group and at least one thiosulfate group, wherein the polysaccharide is poly alpha-1,3-glucan. In a different embodiment, the polysaccharide derivative comprises a polysaccharide substituted with at least one sulfonate group and at least one thiosulfate group, wherein the polysaccharide is poly alpha-1,3-glucan. In an alternate embodiment, the polysaccharide derivative comprises a polysaccharide substituted with at least one sulfate group, at least one sulfonate group, and at least one thiosulfate group, wherein the polysaccharide is poly alpha-1,3-glucan.

In one embodiment, the polysaccharide derivative comprises a polysaccharide substituted with at least one sulfate group, wherein the polysaccharide is poly alpha-1,6-glucan. In another embodiment, the polysaccharide derivative comprises a polysaccharide substituted with at least one sulfonate group, wherein the polysaccharide is poly alpha-1,6-glucan. In a further embodiment, the polysaccharide derivative comprises poly alpha-1,6-glucan substituted with at least one alkyl sulfonate group. In yet a further embodiment, the polysaccharide derivative comprises poly alpha-1,6-glucan substituted with at least one alkyl sulfonate group, wherein the alkyl sulfonate is ethyl sulfonate, propyl sulfonate, butyl sulfonate, or a combination thereof. In an additional embodiment, the polysaccharide derivative comprises a polysaccharide substituted with at least one thiosulfate group, wherein the polysaccharide is poly alpha-1,6-glucan. In a further embodiment, the polysaccharide derivative comprises a polysaccharide substituted with at least one sulfate group and at least one sulfonate group, wherein the polysaccharide is poly alpha-1,6-glucan. In yet a further embodiment, the polysaccharide derivative comprises a polysaccharide substituted with at least one sulfate group and at least one thiosulfate group, wherein the polysaccharide is poly alpha-1,6-glucan. In a different embodiment, the polysaccharide derivative comprises a polysaccharide substituted with at least one sulfonate group and at least one thiosulfate group, wherein the polysaccharide is poly alpha-1,6-glucan. In an alternate embodiment, the polysaccharide derivative comprises a polysaccharide substituted with at least one sulfate group, at least one sulfonate group, and at least one thiosulfate group, wherein the polysaccharide is poly alpha-1,6-glucan.

In one embodiment, the polysaccharide derivative comprises a polysaccharide substituted with at least one sulfate group, wherein the polysaccharide is poly alpha-1,3-1,6-glucan. In another embodiment, the polysaccharide derivative comprises a polysaccharide substituted with at least one sulfonate group, wherein the polysaccharide is poly alpha-1,3-1,6-glucan. In a further embodiment, the polysaccharide derivative comprises poly alpha-1,3-1,6-glucan substituted with at least one alkyl sulfonate group. In yet a further embodiment, the polysaccharide derivative comprises poly alpha-1,3-1,6-glucan substituted with at least one alkyl sulfonate group, wherein the alkyl sulfonate is ethyl sulfonate, propyl sulfonate, butyl sulfonate, or a combination thereof. In an additional embodiment, the polysaccharide derivative comprises a polysaccharide substituted with at least one thiosulfate group, wherein the polysaccharide is poly alpha-1,3-1,6-glucan. In a further embodiment, the polysaccharide derivative comprises a polysaccharide substituted with at least one sulfate group and at least one sulfonate group, wherein the polysaccharide is poly alpha-1,3-1,6-glucan. In yet a further embodiment, the polysaccharide derivative comprises a polysaccharide substituted with at least one sulfate group and at least one thiosulfate group, wherein the polysaccharide is poly alpha-1,3-1,6-glucan. In a different embodiment, the polysaccharide derivative comprises a polysaccharide substituted with at least one sulfonate group and at least one thiosulfate group, wherein the polysaccharide is poly alpha-1,3-1,6-glucan. In an alternate embodiment, the polysaccharide derivative comprises a polysaccharide substituted with at least one sulfate group, at least one sulfonate group, and at least one thiosulfate group, wherein the polysaccharide is poly alpha-1,3-1,6-glucan.

It may be preferred that the polysaccharide does not comprise a hydrophobic moiety. Such hydrophobic moieties are selected from the group consisting of $C_1$ to $C_{18}$ alkyl, a $C_2$ to $C_{18}$ alkene, a $C_2$ to $C_{18}$ alkyne, a polyether comprising repeat units of ($-CH_2CH_2O-$), ($-CH_2CH(CH_3)O-$), or mixtures thereof, wherein the total number of repeat units is in the range of from 3 to 100, a $C_6$ to $C_{20}$ aryl, a benzyl, a $C_1$-$C_{18}$ alkyl sulfonyl, a $C_6$-$C_{20}$ aryl sulfonyl, a p-toluenesulfonyl group, or a combination thereof. It may be preferred that the polysaccharide does not comprise a hydrophobic moiety selected from the above group.

The polysaccharide derivative has a degree of substitution of about 0.001 to about 3.0. The term "degree of substitution" DoS as used herein refers to the average number of hydroxyl groups substituted in each monomeric unit (glucose) of the polysaccharide. Since there are at most three hydroxyl groups in a glucose monomeric unit in a glucan polymer, the overall degree of substitution can be no higher than 3. In other embodiments, the degree of substitution can be in the range of from 0.02 to 2.5, or from 0.02 to 2.0, or from 0.2 to 2, or from 0.2 to 1. In one embodiment, the degree of substitution can be in the range of about 0.5 to about 1.5. Alternatively, the DoS can be about 0.001, 0.005, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, or any value between 0.001 and 3. It would be understood by those skilled in the art that since a polysaccharide derivative as disclosed herein has a degree of substitution between about 0.001 to about 3.0, the substituents on the polysaccharide cannot only be hydrogen. The degree of substitution of a polysaccharide derivative as disclosed herein can be stated with reference to the at least one sulfate group, with reference to the at least one sulfonate group, with reference to the at least one thiosulfate group, or with reference to the overall degree of substitution, that is, the sum of the DoS of the sulfate, sulfonate, and thiosulfate groups. As used herein, when the degree of substitution is not stated with reference to a specific group, the overall degree of substitution is meant. As the polysaccharide derivative comprises a polysaccharide substituted with at least one of: a) at least one sulfate group; b) at least one sulfonate group; c) at least one thiosulfate group; or d) a combination thereof, the DoS with reference to the sulfate group alone, or with reference to the sulfonate group alone, or with reference to the thiosulfate group alone, is necessarily less than 3. The desired DoS is chosen to provide the desired solubility and performance in the specific application of interest.

In one embodiment, the DoS of the polysaccharide derivative with respect to the sulfate group(s) can be in the range of from about 0.02 to about 1.5, or for example from about 0.1 to about 1. In another embodiment, the DoS of the polysaccharide derivative with respect to the sulfonate group(s) can be in the range of from about 0.1 to about 2.5, or for example from about 0.2 to about 1.5, or for example from about 0.1 to about 1. In an additional embodiment, the DoS of the polysaccharide derivative with respect to the thiosulfate group(s) can be in the range of from about 0.02 to about 2.5, or for example from about 0.1 to about 2.5, or from about 0.1 to about 1. The polysaccharide derivative has a weight average degree of polymerization in the range of from about 5 to about 1400, for example in the range of from about 5 to about 100, or from about 5 to about 500, or from about 5 to about 1000, or from about 5 to about 1100, or from about 5 to about 1200, or from about 5 to about 1300, or from about 5 to about 1400.

The structure, molecular weight, and degree of substitution of a polysaccharide derivative can be confirmed using various physiochemical analyses known in the art such as NMR spectroscopy and size exclusion chromatography (SEC).

The "molecular weight" of a polysaccharide or polysaccharide derivative can be represented as number-average molecular weight ($M_n$) or as weight-average molecular weight ($M_w$). Alternatively, molecular weight can be represented as Daltons, grams/mole, DPw (weight average degree of polymerization), or DPn (number average degree of polymerization). Various means are known in the art for calculating these molecular weight measurements, such as high-pressure liquid chromatography (HPLC), size exclusion chromatography (SEC), or gel permeation chromatography (GPC).

The terms "poly alpha-1,3-glucan", "alpha-1,3-glucan polymer" and "glucan polymer" are used interchangeably herein. Poly alpha-1,3-glucan means a polymer comprising glucose monomeric units linked together by glycosidic linkages, wherein at least about 50% of the glycosidic linkages are alpha-1,3-glycosidic linkages. Poly alpha-1,3-glucan is a type of polysaccharide. The alpha-1,3-glycosodic linkage of the poly alpha-1,3-glucan can be illustrated by Structure V as follows:

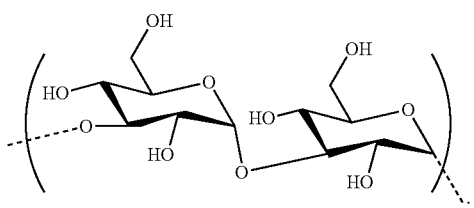

Structure V

The poly alpha-1,3-glucan can be prepared using chemical methods. Alternatively, it can be prepared by extracting it from various organisms, such as fungi, that produce poly alpha-1,3-glucan. Alternatively, poly alpha-1,3-glucan can be enzymatically produced from sucrose using one or more glucosyltransferase (gtf) enzymes (e.g., gtfJ), such as described in U.S. Pat. Nos. 7,000,000; 8,642,757; and 9,080,195 (the entirety of which are incorporated herein by reference), for example. Using the procedures given therein, the polymer is made directly in a one-step enzymatic reaction using a recombinant glucosyltransferase enzyme, for example the gtfJ enzyme, as the catalyst and sucrose as the substrate. The poly alpha-1,3-glucan is produced with fructose as the by-product. As the reaction progresses, the poly alpha-1,3-glucan precipitates from solution. Produced using the gtfJ enzyme, the poly alpha-1,3-glucan can have a number average degree of polymerization (DPn) in the range of 4 to 500. In other embodiments, the DPn can be in the range of from 30 to 500 or from 40 to 500 or from 50 to 400. In some embodiments, the poly alpha-1,3-glucan has a DPw of from about 10 to about 400, 10 to about 300, 10 to about 200, 10 to about 100, 10 to about 50, 400 to about 1400, or from about 400 to about 1000, or from about 500 to about 900.

In some embodiments, the percentage of glycosidic linkages between the glucose monomer units of the poly alpha-1,3-glucan that are alpha-1,3 is greater than or equal to 50%, 60%, 70%, 80%, 90%, 95%, 96%, 97%, 98%, 99%, or 100% (or any integer value between 50% and 100%). In such embodiments, accordingly, poly alpha-1,3-glucan has less than or equal to 50%, 40%, 30%, 20%, 10%, 5%, 4%, 3%, 2%, 1%, or 0% (or any integer value between 0% and 50%) of glycosidic linkages that are not alpha-1,3. The poly alpha-1,3-glucan may have relatively low percentages of glucose monomers that are linked at the 1,2-, 1,4- and/or 1,6-positions. In some embodiments, the poly alpha-1,3-glucan comprises greater than or equal to 93 to 97% alpha-1,3-glycosidic linkages and less than 3% alpha-1,6-glycosidic linkages. In other embodiments, the poly alpha-1,3-glucan comprises greater than or equal to 95% alpha-1,3-glycosidic linkages and about 1% alpha-1,6-glycosidic linkages. In a further embodiment, the poly alpha-1,3-glucan comprises less than or equal to 1 to 3% alpha-1,3,6-glycosidic linkages.

Insoluble poly alpha-1,3-glucan in some embodiments can be in the form of a copolymer (e.g., graft copolymer) having (i) a backbone comprising dextran (e.g., with at least about 95%, 96%, 97%, 98%, 99%, or 100% alpha-1,6 linkages) with a molecular weight of at least about 100000 Daltons, and (ii) alpha-1,3-glucan side chains comprising at least about 95%, 96%, 97%, 98%, 99%, or 100% alpha-1,3-glucosidic linkages. Such copolymers can be as disclosed in International Pat. Appl. Publ. No. WO2017/079595, the disclosure of which is incorporated herein by reference in its entirety.

The terms "poly alpha-1,6-glucan" and "dextran" are used interchangeably herein. Dextrans represent a family of complex, branched alpha-glucans generally comprising chains of alpha-1,6-linked glucose monomers, with periodic side chains (branches) linked to the straight chains by alpha-1,3-linkage (Ioan et al., *Macromolecules* 33:5730-5739). Production of dextrans is typically done through fermentation of sucrose with bacteria (e.g., *Leuconostoc* or *Streptococcus* species), where sucrose serves as the source of glucose for dextran polymerization (Naessens et al., *J. Chem. Technol. Biotechnol.* 80:845-860; Sarwat et al., *Int. J. Biol. Sci.* 4:379-386; Onilude et al., *Int. Food Res. J.* 20:1645-1651). Poly alpha-1,6-glucan can be prepared using glucosyltransferases such as (but not limited to) GTF1729, GTF1428, GTF5604, GTF6831, GTF8845, GTF0088, and GTF8117 as described in WO2015/183714 and WO2017/091533, both of which are incorporated herein by reference.

The poly alpha-1,6-glucan can have a number average degree of polymerization (DPn) in the range of 4 to 1400. In other embodiments, the DPn can be in the range of from 4 to 100, or from 4 to 500 or from 40 to 500 or from 50 to 400. In some embodiments, the poly alpha-1,6-glucan has a DPw of from about 10 to about 400, 10 to about 300, 10 to about 200, 10 to about 100, 10 to about 50, 400 to about 1400, or from about 400 to about 1000, or from about 500 to about 900.

In some embodiments, the poly alpha-1,6-glucan comprises a backbone of glucose monomer units wherein greater than or equal to 40% of the glucose monomer units are linked via alpha-1,6-glycosodic linkages, for example greater than or equal to 40%, 45%, 50%, 55%, 60%, 65%, 70%, 75%, 80%, or 90% of the glucose monomer units.

Dextran "long chains" herein can comprise "substantially [or mostly] alpha-1,6-glucosidic linkages", meaning that they can have at least about 98.0% alpha-1,6-glucosidic linkages in some aspects. Dextran herein can comprise a "branching structure" (branched structure) in some aspects. It is contemplated that in this structure, long chains branch from other long chains, likely in an iterative manner (e.g., a long chain can be a branch from another long chain, which in turn can itself be a branch from another long chain, and so on). It is contemplated that long chains in this structure can be "similar in length", meaning that the length (DP [degree of polymerization]) of at least 70% of all the long chains in a branching structure is within plus/minus 30% of the mean length of all the long chains of the branching structure.

Dextran in some embodiments can also comprise "short chains" branching from the long chains, typically being one to three glucose monomers in length, and typically comprising less than about 10% of all the glucose monomers of a dextran polymer. Such short chains typically comprise alpha-1,2-, alpha-1,3-, and/or alpha-1,4-glucosidic linkages (it is understood that there can also be a small percentage of such non-alpha-1,6 linkages in long chains in some aspects). In certain embodiments, the poly-1,6-glucan with branching is produced enzymatically according to the procedures in WO2015/183714 and WO2017/091533 where, for example, alpha-1,2-branching enzymes such as "gtfJ18T1" or "GTF9905" can be added during or after the production of the dextran polymer (polysaccharide). In other embodiments, any other enzyme known to produce alpha-1,2-branching can be added. The degree of branching of poly-alpha-1,6 glucan in such embodiments has less than or equal to 50%, 40%, 30%, 20%, 10%, 5%, 4%, 3%, 2%, 1%, or 0% (or any integer value between 0% and 50%) of short branching, for example alpha-1,2-branching. In one embodiment, the poly alpha-1,6-glucan has a degree of alpha-1,2-branching that is less than 50%. In one embodiment, the poly alpha-1,6-glucan is predominantly linear. In one embodiment, the polysaccharide is poly alpha-1,3-1,6-glucan. Poly alpha-1,3-1,6-glucan is a product of a glucosyltransferase enzyme, as disclosed in United States Patent Application Publication 2015/0232785 A1. In some embodiments, an insoluble alpha-glucan can comprise at least about 30% alpha-1,3 linkages and a percentage of alpha-1,6 linkages that brings the total of both the alpha-1,3 and -1,6 linkages in the alpha-glucan to 100%. For example, the percentage of alpha-1,3 and -1,6 linkages can be about 30-40% and 60-70%, respectively. In some aspects, an insoluble alpha-glucan comprising at least about 30% alpha-1,3 linkages is linear. Glucosyltransferases for producing insoluble alpha-glucan comprising at least about 30% alpha-1,3 linkages are disclosed in U.S. Pat. Appl. Publ. No. 2015/0232819, the disclosure of which is incorporated herein by reference in its entirety.

In one embodiment, the polysaccharide comprises poly alpha-1,3-1,6-glucan wherein (i) at least 30% of the glycosidic linkages of the poly alpha-1,3-1,6-glucan are alpha-1,3 linkages, (ii) at least 30% of the glycosidic linkages of the poly alpha-1,3-1,6-glucan are alpha-1,6 linkages, (iii) the poly alpha-1,3-1,6-glucan has a weight average degree of polymerization ($DP_w$) of at least 10; and (iv) the alpha-1,3 linkages and alpha-1,6 linkages of the poly alpha-1,3-1,6-glucan do not consecutively alternate with each other. In another embodiment, at least 60% of the glycosidic linkages of the poly alpha-1,3-1,6-glucan are alpha-1,6 linkages.

At least 30% of the glycosidic linkages of poly alpha-1,3-1,6-glucan are alpha-1,3 linkages, and at least 30% of the glycosidic linkages of the poly alpha-1,3-1,6-glucan are alpha-1,6 linkages. Alternatively, the percentage of alpha-1,3 linkages in poly alpha-1,3-1,6-glucan herein can be at least 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, or 64%. Alternatively still, the percentage of alpha-1,6 linkages in poly alpha-1,3-1,6-glucan herein can be at least 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, or 69%.

A poly alpha-1,3-1,6-glucan can have any one the aforementioned percentages of alpha-1,3 linkages and any one of the aforementioned percentages of alpha-1,6 linkages, just so long that the total of the percentages is not greater than 100%. For example, poly alpha-1,3-1,6-glucan herein can have (i) any one of 30%, 31%, 32%, 33%, 34%, 35%, 36%, 37%, 38%, 39%, or 40% (30%-40%) alpha-1,3 linkages and (ii) any one of 60%, 61%, 62%, 63%, 64%, 65%, 66%, 67%, 68%, or 69% (60%-69%) alpha-1,6 linkages, just so long that the total of the percentages is not greater than 100%. Non-limiting examples include poly alpha-1,3-1,6-glucan with 31% alpha-1,3 linkages and 67% alpha-1,6 linkages. In certain embodiments, at least 60% of the glycosidic linkages of the poly alpha-1,3-1,6-glucan are alpha-1,6 linkages.

A poly alpha-1,3-1,6-glucan can have, for example, less than 10%, 9%, 8%, 7%, 6%, 5%, 4%, 3%, 2%, or 1% of glycosidic linkages other than alpha-1,3 and alpha-1,6. In another embodiment, a poly alpha-1,3-1,6-glucan only has alpha-1,3 and alpha-1,6 linkages.

The backbone of a poly alpha-1,3-1,6-glucan disclosed herein can be linear/unbranched. Alternatively, there can be branches in the poly alpha-1,3-1,6-glucan. A poly alpha-1,3-1,6-glucan in certain embodiments can thus have no branch points or less than about 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, or 1% branch points as a percent of the glycosidic linkages in the polymer.

The alpha-1,3 linkages and alpha-1,6 linkages of a poly alpha-1,3-1,6-glucan do not consecutively alternate with each other. For the following discussion, consider that . . . G-1,3-G-1,6-G-1,3-G-1,6-G-1,3-G- . . . (where G represents glucose) represents a stretch of six glucose monomeric units linked by consecutively alternating alpha-1,3 linkages and alpha-1,6 linkages. Poly alpha-1,3-1,6-glucan in certain embodiments herein comprises less than 2, 3, 4, 5, 6, 7, 8, 9, 10, or more glucose monomeric units that are linked consecutively with alternating alpha-1,3 and alpha-1,6 linkages.

The molecular weight of a poly alpha-1,3-1,6-glucan can be measured as $DP_w$ (weight average degree of polymerization) or $DP_n$ (number average degree of polymerization). Alternatively, molecular weight can be measured in Daltons or grams/mole. It may also be useful to refer to the number-average molecular weight ($M_n$) or weight-average molecular weight ($M_w$) of the poly alpha-1,3-1,6-glucan.

A poly alpha-1,3-1,6-glucan herein can have an $M_w$ of at least about 1600, 3000, 4000, 5000, 8000, 10000, 15000, 20000, 25000, 30000, 35000, 40000, 50000, 100000, 200000, 300000, 400000, 500000, 600000, 700000, 800000, 900000, 1000000, 1100000, 1200000, 1300000, 1400000, 1500000, or 1600000 (or any integer between 50000 and 1600000), for example. The $M_w$ in certain embodiments is at least about 1000000. Alternatively, poly alpha-1,3-1,6-glucan can have an $M_w$ of at least about 1600, 3000, 4000, 5000, 10000, 20000, 30000, or 40000, for example.

A poly alpha-1,3-1,6-glucan herein can comprise at least 10 glucose monomeric units, for example. Alternatively, the number of glucose monomeric units can be at least 10, 25, 50, 100, 500, 1000, 2000, 3000, 4000, 5000, 6000, 7000, 8000, or 9000 (or any integer between 10 and 9000), for example.

The polysaccharide derivatives disclosed herein can be obtained by chemical derivatization of an appropriate polysaccharide using methods known in the art. Sulfates and sulfonates of poly glucans may be produced analogously as described in Solarek, D. B., *Phosphoryated Starches and Miscellaneous Inorganic Esters in Modified Starches: Properties and Uses*, Wurzburg, O. B., Ed., CRC Press, Inc. Boca Raton, Fla., 1986, pp. 97-108. Polysaccharides can be sulfated by a variety of methods, including sulfation with sulfuric acid, chorosulfonic acid in organic solvents, or sulfur trioxide complexes, as described in Modified Starches: properties and Uses, by O. B. Wurzburg, CRC Press, 2000).

Sulfoalkyl polysaccharides can be produced by reacting the polysaccharide with haloalkyl sulfonic acid, ethylene sulfonic acid (to produce sulfoalkyl), or alkylsultone. For example, sulfoethyl polysaccharide may be produced by reacting chloroethyl sulfonic acid or vinyl sulfonic acid. Sulfopropyl polysaccharide may be produced from 3-propanesultone or 3-chloro-1-propylsulfonic acid. Similarly sulfobutyl polysaccharide may be prepared from 1,4-butane sultone or from 4-chloro-1-butanesulfonic acid. The degree of substitution is controlled by reagent mol equivalents.

Polysaccharides substituted with thiosulfate groups can be produced by reacting the polysaccharide with sodium thiosulfate. Polysaccharide substituted with thiosulfate groups can produced by first functionalizing the polysaccharide with a functional group that can be subsequently displaced with sodium thiosulfate. The group may be selected from halide (Cl, Br, I), or tresyl, mesyl, or phenyl carbonate, for example.

Depending upon the desired application, the polysaccharide derivatives disclosed herein can be formulated, for example, blended, mixed, or incorporated into, with one or more other materials and/or active ingredients suitable for use in various products, for example products for use in laundry care, textile/fabric care. The term "product comprising the polysaccharide derivative" in this context may include, for example, aqueous formulations, rheology modifying products, fabric treatment/care products, laundry care formulations/products or fabric softeners, each comprising poly alpha-1,3-glucan, poly alpha-1,6-glucan, or poly alpha-1,3-1,6-glucan substituted with at least one of: a) at least one sulfate group; b) at least one sulfonate group; c) at least one thiosulfate group; or d) a combination thereof; wherein the the polysaccharide derivative has a degree of substitution of about 0.001 to about 3.

As used herein, the term "effective amount" refers to the amount of the substance used or administered that is suitable to achieve the desired effect. The effective amount of material may vary depending upon the application. One of skill in the art will typically be able to determine an effective amount for a particular application or subject without undo experimentation.

The term "resistance to enzymatic hydrolysis" refers to the relative stability of the polysaccharide derivative to enzymatic hydrolysis. Having a resistance to hydrolysis is important for the use of these materials in applications wherein enzymes are present, such as in detergent, fabric care, and/or laundry care applications. In some embodiments, the polysaccharide derivative is resistant to cellulases. In other embodiments, the polysaccharide derivative is resistant to proteases. In still further embodiments, the polysaccharide derivative is resistant to amylases. In yet other embodiments, the polysaccharide derivative is resistant to lipases. In yet other embodiments, the polysaccharide derivative is resistant to mannanases. In other embodiments, the polysaccharide derivative is resistant to multiple classes of enzymes, for example, two or more cellulases, proteases, amylases, lipases, mannanases, or combinations thereof. Resistance to any particular enzyme will be defined as having at least 10, 20, 30, 40, 50, 60, 70, 80, 90, 95 or 100% of the materials remaining after treatment with the respective enzyme. The percentage remaining may be determined by measuring the supernatant after enzyme treatment using SEC-HPLC. The assay to measure enzyme resistance can be determined using the following procedure: A sample of the polysaccharide derivative is added to water in a vial and mixed using a PTFE magnetic stir bar to create a 1 percent by weight aqueous solution. The aqueous mixture is produced at pH 7.0 and 20° C. After the polysaccharide derivative thereof has completely dissolved, 1.0 milliliter (mL) (1 percent by weight of the enzyme formulation) of cellulase (PURADEX® EGL), amylase (PURASTAR® ST L) protease (SAVINASE® 16.0 L), or lipase (Lipex® 100 L) is added and mixed for 72 hours (hrs) at 20° C. After 72 hrs of stirring, the reaction mixture is heated to 70° C. for 10 minutes to inactivate the added enzyme, and the resulting mixture is cooled to room temperature and centrifuged to remove any precipitate. The supernatant is analyzed by SEC-HPLC for recovered polysaccharide derivative and compared to a control where no enzyme was added to the reaction mixture. Percent changes in area counts for the respective polysaccharide derivative thereof may be used to test the relative resistance of the materials to the respective enzyme treatment. Percent changes in area versus the total will be used to assess the relative amount of materials remaining after treatment with a particular enzyme. Materials having a percent recovery of at least 10%, preferably at least 50, 60, 70, 80, 90, 95 or 100% will be considered "resistant" to the respective enzyme treatment.

The phrase "aqueous composition" herein refers to a solution or mixture in which the solvent is at least about 1% by weight of water and which comprises the polysaccharide derivative.

The terms "hydrocolloid" and "hydrogel" are used interchangeably herein. A hydrocolloid refers to a colloid system in which water is the dispersion medium. A "colloid" herein refers to a substance that is microscopically dispersed throughout another substance. Therefore, a hydrocolloid herein can also refer to a dispersion, emulsion, mixture, or solution of the polysaccharide derivative in water or aqueous solution.

The term "aqueous solution" herein refers to a solution in which the solvent is water. The polysaccharide derivative can be dispersed, mixed, and/or dissolved in an aqueous solution. An aqueous solution can serve as the dispersion medium of a hydrocolloid herein.

The terms "dispersant" and "dispersion agent" are used interchangeably herein to refer to a material that promotes the formation and stabilization of a dispersion of one substance in another. A "dispersion" herein refers to an aqueous composition comprising one or more particles, for example, any ingredient of a personal care product, pharmaceutical product, food product, household product or industrial product that are scattered, or uniformly distributed, throughout the aqueous composition. It is believed that the polysaccharide derivative can act as a dispersant in aqueous compositions disclosed herein.

The term "viscosity" as used herein refers to the measure of the extent to which a fluid or an aqueous composition such as a hydrocolloid resists a force tending to cause it to flow. Various units of viscosity that can be used herein include centipoise (cPs) and Pascal-second (Pa·s). A centipoise is one one-hundredth of a poise; one poise is equal to 0.100 kg·m$^{-1}$·s$^{-1}$. Thus, the terms "viscosity modifier" and "viscosity-modifying agent" as used herein refer to anything that can alter/modify the viscosity of a fluid or aqueous composition.

The terms "fabric", "textile", and "cloth" are used interchangeably herein to refer to a woven or non-woven material having a network of natural and/or artificial fibers. Such fibers can be thread or yarn, for example.

A "fabric care product" herein is any product suitable for treating fabric in some manner. Suitable examples of such a product include non-laundering fiber treatments (for desizing, scouring, mercerizing, bleaching, coloration, dying, printing, bio-polishing, anti-microbial treatments, anti-wrinkle treatments, stain resistance treatments, etc.), laundry care products (e.g., laundry care detergents), and fabric softeners.

The terms "detergent product", "heavy duty detergent", "all-purpose detergent" and "detergent composition" are used interchangeably herein to refer to a product useful for regular washing of a substrate, for example, dishware, cutlery, vehicles, fabrics, carpets, apparel, white and colored textiles at any temperature. Detergent products for treating of fabrics, hard surfaces and any other surfaces in the area of fabric and home care, include: laundry detergents, fabric conditioners (including softeners), laundry and rinse additives and care compositions, fabric freshening compositions, laundry prewash, laundry pretreat, hard surface treatment compositions, car care compositions, dishwashing compositions (including hand dishwashing and automatic dishwashing products), air care products, detergent contained on or in a porous substrate or nonwoven sheet, and other cleaner products for consumer or institutional use.

The terms "cellulase" and "cellulase enzyme" are used interchangeably herein to refer to an enzyme that hydrolyzes β-1,4-D-glucosidic linkages in cellulose, thereby partially or completely degrading cellulose. Cellulase can alternatively be referred to as "β-1,4-glucanase", for example, and can have endocellulase activity (EC 3.2.1.4), exocellulase activity (EC 3.2.1.91), or cellobiase activity (EC 3.2.1.21). A cellulase in certain embodiments herein can also hydrolyze β-1,4-D-glucosidic linkages in cellulose ether derivatives such as carboxymethyl cellulose. "Cellulose" refers to an insoluble polysaccharide having a linear chain of β-1,4-linked D-glucose monomeric units.

As used herein, the term "fabric hand" or "handle" is meant people's tactile sensory response towards fabric which may be physical, physiological, psychological, social or any combination thereof. In some embodiments, the fabric hand may be measured using a PHABROMETER® System (available from Nu Cybertek, Inc. Davis, Calif.) for measuring the relative hand value as given by the American Association of Textile Chemists and Colorists (AATCC test method "202-2012, Relative Hand Value of Textiles: Instrumental Method").

The product can be in the form of a liquid, a gel, a powder, a hydrocolloid, an aqueous solution, a granule, a tablet, a capsule, a single compartment sachet, a multi-compartment sachet, a single compartment pouch, or a multi-compartment pouch. In some embodiments, the product is in the form of a liquid, a gel, a powder, a single compartment sachet, or a multi-compartment sachet.

In some embodiments, products comprising a polysaccharide derivative as disclosed herein can be in the form of a fabric care product. A fabric care product can be used for hand wash, machine wash and/or other purposes such as soaking and/or pretreatment of fabrics, for example. A fabric care product may take the form of, for example, a laundry detergent; fabric conditioner; any wash-, rinse-, or dryer-added product; unit dose or spray. Fabric care products in a liquid form may be in the form of an aqueous composition. In other embodiments, a fabric care product can be in a dry form such as a granular detergent or dryer-added fabric softener sheet. Other non-limiting examples of fabric care products can include: granular or powder-form all-purpose or heavy-duty washing agents; liquid, gel or paste-form all-purpose or heavy-duty washing agents; liquid or dry fine-fabric (e.g. delicates) detergents; cleaning auxiliaries such as bleach additives, "stain-stick", or pre-treatments; substrate-laden products such as dry and wetted wipes, pads, or sponges; sprays and mists; water-soluble unit dose articles.

The product formulation comprising the polysaccharide derivative described herein may be optionally diluted with water, or a solution predominantly comprised of water, to produce a formulation with the desired polysaccharide derivative concentration for the target application. Clearly one of skill in the art can adjust the reaction components and/or dilution amounts to achieve the desired polysaccharide derivative concentration for the chosen product.

The product can be in any useful form, for example, as powders, granules, pastes, bars, unit dose, or liquid.

The unit dose form may be water-soluble, for example, a water-soluble unit dose article comprising a water-soluble film and a liquid or solid laundry detergent composition, also referred to as a pouch. A water-soluble unit dose pouch comprises a water-soluble film which fully encloses the liquid or solid detergent composition in at least one compartment. The water-soluble unit dose article may comprise a single compartment or multiple compartments. The water-soluble unit dose article may comprise at least two compartments or at least three compartments. The compartments may be arranged in a superposed orientation or in a side-by-side orientation.

A unit dose article is typically a closed structure, made of the water-soluble film enclosing an internal volume which comprises the liquid or solid laundry detergent composition. The pouch can be of any form and shape which is suitable to hold and protect the composition, e.g. without allowing the release of the composition from the pouch prior to contact of the pouch to water.

A liquid detergent composition may be aqueous, typically containing up to about 70% by weight of water and 0% to about 30% by weight of organic solvent. It may also be in the form of a compact gel type containing less than or equal to 30% by weight water.

The polysaccharide derivative comprising a polysaccharide substituted with at least one of: a) at least one sulfate group, b) at least one sulfonate group, c) at least one thiosulfate group; or d) a combination thereof, wherein the polysaccharide is poly alpha-1,3-glucan, poly alpha-1,6-glucan, poly alpha-1,3-1,6-glucan, or a mixture thereof, can be used as an ingredient in the desired product or may be blended with one or more additional suitable ingredients and used as, for example, fabric care applications, laundry care applications, and/or home care applications. Any of the disclosed products, for example, a fabric care, a laundry care or a home care product can comprise in the range of 0.01 to 99 percent by weight of the polysaccharide derivative, based on the total dry weight of the product (dry solids basis). The term "total dry weight" means the weight of the product excluding any solvent, for example, any water that might be present. In other embodiments, the product comprises 0.1 to 10% or 0.1 to 9% or 0.5 to 8% or 1 to 7% or 1 to 6% or 1 to 5% or 1 to 4% or 1 to 3% or 5 to 10% or 10 to 15% or 15 to 20% or 20 to 25% or 25 to 30% or 30 to 35% or 35 to 40% or 40 to 45% or 45 to 50% or 50 to 55% or 55 to 60% or 60 to 65% or 65 to 70% or 70 to 75% or 75 to 80% or 80 to 85% or 85 to 90% or 90 to 95% or 95 to 99% by weight of the polysaccharide derivative, wherein the percentages by weight are based on the total dry weight of the product.

The product can further comprise at least one of a surfactant, an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil re-deposition agent, a dye, a bactericide, a tarnish inhibitor, an optical brightener, a perfume, a saturated or unsaturated fatty acid, a dye transfer inhibiting agent, a chelating agent, a hueing dye, a calcium cation, a magnesium cation, a visual signaling ingredient, an anti-foam, a structurant, a thickener, an anti-caking agent, a starch, sand, a gelling agents, or a combination thereof. In one embodiment, the enzyme is a cellulase. In another embodiment, the enzyme is a protease. In yet another embodiment, the enzyme is an amylase. In a further embodiment, the enzyme is a lipase.

The product can be a detergent product useful for, for example, fabric care, laundry care and/or home care and may further contain one or more active enzymes. Non-limiting examples of suitable enzymes include proteases, cellulases, hemicellulases, peroxidases, lipolytic enzymes (e.g., metallolipolytic enzymes), xylanases, lipases, phospholipases, esterases (e.g., arylesterase, polyesterase), perhydrolases, cutinases, pectinases, pectate lyases, mannanases, keratinases, reductases, oxidases (e.g., choline oxidase), phenoloxidases, lipoxygenases, ligninases, pullulanases, tannases, pentosanases, malanases, beta-glucanases, arabinosidases, hyaluronidases, chondroitinases, laccases, metalloproteinases, amadoriases, glucoamylases, arabinofuranosidases, phytases, isomerases, transferases, amylases or a combination thereof. If an enzyme(s) is included, it may be present in the product at about 0.0001 to 0.1% by weight of the active enzyme, based on the total weight of the composition. In other embodiments, the enzyme can be present at about 0.01 to 0.03% by weight of the active enzyme (e.g., calculated as pure enzyme protein) based on the total weight of the composition. In some embodiments, a combination of two or more enzymes can be used in the composition. In some embodiments, the two or more enzymes are cellulase and one or more of proteases, hemicellulases, peroxidases, lipolytic enzymes, xylanases, lipases, phospholipases, esterases, perhydrolases, cutinases, pectinases, pectate lyases, mannanases, keratinases, reductases, oxidases, phenoloxidases, lipoxygenases, ligninases, pullulanases, tannases, pentosanases, malanases, beta-glucanases, arabinosidases, hyaluronidases, chondroitinases, laccases, metalloproteinases, amadoriases, glucoamylases, arabinofuranosidases, phytases, isomerases, transferases, amylases or a combination thereof.

In some embodiments, the composition can comprise one or more enzymes, each enzyme present from about 0.00001% to about 10% by weight, based on the total weight of the composition. In some embodiments, the composition can also comprise each enzyme at a level of about 0.0001% to about 10%, about 0.001% to about 5%, about 0.001% to about 2% or about 0.005% to about 0.5% by weight, based on the total weight of the composition.

A cellulase can have endocellulase activity (EC 3.2.1.4), exocellulase activity (EC 3.2.1.91), or cellobiase activity (EC 3.2.1.21). A cellulase is an "active cellulase" having activity under suitable conditions for maintaining cellulase activity; it is within the skill of the art to determine such suitable conditions. Besides being able to degrade cellulose, a cellulase in certain embodiments can also degrade cellulose ether derivatives such as carboxymethyl cellulose.

The cellulase may be derived from any microbial source, such as a bacteria or fungus. Chemically-modified cellulases or protein-engineered mutant cellulases are included. Suitable cellulases include, for example, cellulases from the genera *Bacillus, Pseudomonas, Streptomyces, Trichoderma, Humicola, Fusarium, Thielavia* and *Acremonium*. As other examples, the cellulase may be derived from *Humicola insolens, Myceliophthora thermophile, Fusarium oxysporum, Trichoderma reesei* or a combination thereof. The cellulase, such as any of the foregoing, can be in a mature form lacking an N-terminal signal peptide. Commercially available cellulases useful herein include CELLUSOFT®, CELLUCLEAN®, CELLUZYME® and CAREZYME® (Novozymes A/S); CLAZINASE® and PURADAX® HA and REVITALENZ™ (DuPont Industrial Biosciences), BIOTOUCH® (AB Enzymes); and KAC-500(B)® (Kao Corporation).

Alternatively, a cellulase herein may be produced by any means known in the art, for example, a cellulase may be produced recombinantly in a heterologous expression system, such as a microbial or fungal heterologous expression system. Examples of heterologous expression systems include bacterial (e.g., *E. coli, Bacillus* sp.) and eukaryotic systems. Eukaryotic systems can employ yeast (e.g., *Pichia* sp., *Saccharomyces* sp.) or fungal (e.g., *Trichoderma* sp. such as *T. reesei, Aspergillus* species such as *A. niger*) expression systems, for example.

The cellulase in certain embodiments can be thermostable. Cellulase thermostability refers to the ability of the enzyme to retain activity after exposure to an elevated temperature (e.g. about 60-70° C.) for a period of time (e.g., about 30-60 minutes). The thermostability of a cellulase can be measured by its half-life (t1/2) given in minutes, hours, or days, during which time period half the cellulase activity is lost under defined conditions.

The cellulase in certain embodiments can be stable to a wide range of pH values (e.g. neutral or alkaline pH such as pH of ~7.0 to ~11.0). Such enzymes can remain stable for a predetermined period of time (e.g., at least about 15 min., 30 min., or 1 hour) under such pH conditions.

At least one, two, or more cellulases may be included in the composition. The total amount of cellulase in a composition herein typically is an amount that is suitable for the purpose of using cellulase in the composition (an "effective amount"). For example, an effective amount of cellulase in a composition intended for improving the feel and/or appearance of a cellulose-containing fabric is an amount that produces measurable improvements in the feel of the fabric (e.g., improving fabric smoothness and/or appearance, removing pills and fibrils which tend to reduce fabric appearance sharpness). As another example, an effective amount of cellulase in a fabric stonewashing composition herein is that amount which will provide the desired effect (e.g., to produce a worn and faded look in seams and on fabric panels). The amount of cellulase in a composition herein can also depend on the process parameters in which the composition is employed (e.g., equipment, temperature, time, and the like) and cellulase activity, for example. The effective concentration of cellulase in an aqueous composition in which a fabric is treated can be readily determined by a skilled artisan. In fabric care processes, cellulase can be present in an aqueous composition (e.g., wash liquor) in which a fabric is treated in a concentration that is minimally about 0.01-0.1 ppm total cellulase protein, or about 0.1-10 ppb total cellulase protein (e.g., less than 1 ppm), to maximally about 100, 200, 500, 1000, 2000, 3000, 4000, or 5000 ppm total cellulase protein, for example.

Suitable enzymes are known in the art and can include, for example, MAXATASE®, MAXACAL™, MAXAPEM™, OPTICLEAN®, OPTIMASE®, PROPERASE®, PURAFECT®, PURAFECT® OXP, PURAMAX™, EXCELLASE™, PREFERENZ™ proteases (e.g. P100, P110, P280), EFFECTENZ™ proteases (e.g. P1000, P1050, P2000), EXCELLENZ™ proteases (e.g. P1000), ULTIMASE®, and PURAFAST™ (Genencor); ALCALASE®, SAVINASE®, PRIMASE®, DURAZYM™, POLARZYME®, OVOZYME®, KANNASE®, LIQUANASE®, NEUTRASE®, RELASE® and ESPERASE® (Novozymes); BLAP™ and BLAP™ variants (Henkel Kommanditgesellschaft auf Aktien, Duesseldorf, Germany), and KAP (*B. alkalophilus* subtilisin; Kao Corp., Tokyo, Japan) proteases; MANNASTAR®, PURABRITE™, and MANNAWAY® mannanases; M1 LIPASE™, LUMA FAST™, and LIPOMAX™ (Genencor); LIPEX®, LIPOLASE® and LIPOLASE® ULTRA (Novozymes); and LIPASE P™ "Amano" (Amano Pharmaceutical Co. Ltd., Japan) lipases; STAINZYME®, STAINZYME PLUS®, NATALASE®, DURAMYL®, TERMAMYL®, TERMAMYL ULTRA®, FUNGAMYL® and BAN™ (Novo Nordisk A/S and Novozymes A/S); RAPIDASE®, POWERASE®, PURASTAR® and PREFERENZ™ (DuPont Industrial Biosciences) amylases; GUARDZYME™ (Novo Nordisk A/S and Novozymes A/S) peroxidases or a combination thereof.

In some embodiments, the enzymes in the composition can be stabilized using conventional stabilizing agents, e.g., a polyol such as propylene glycol or glycerol; a sugar or sugar alcohol; lactic acid; boric acid or a boric acid derivative (e.g., an aromatic borate ester).

A detergent composition herein typically comprises one or more surfactants, wherein the surfactant is selected from nonionic surfactants, anionic surfactants, cationic surfactants, ampholytic surfactants, zwitterionic surfactants, semipolar nonionic surfactants and mixtures thereof. The surfactant may be petroleum-derived (also referred to as synthetic) or non-petroleum-derived (also referred to as natural). In some embodiments, the surfactant is present at a level of from about 0.1% to about 60%, while in alternative embodiments the level is from about 1% to about 50%, while in still further embodiments the level is from about 5% to about 40%, by weight of the cleaning composition. A detergent will usually contain 0% to about 50% by weight of an anionic surfactant such as linear alkylbenzenesulfonate (LAS), alpha-olefinsulfonate (AOS), alkyl sulfate (fatty alcohol sulfate) (AS), alcohol ethoxysulfate (AEOS or AES), secondary alkanesulfonates (SAS), alpha-sulfo fatty acid methyl esters, alkyl- or alkenylsuccinic acid, or soap.

The detergent composition may comprise an alcohol ethoxysulfate of the formula $(OCH_2CH_2)_x$—O—$SO_3M$, wherein $R^1$ is a non-petroleum derived, linear or branched fatty alcohol consisting of even numbered carbon chain lengths of from about $C_8$ to about $C_{20}$, and wherein x is from about 0.5 to about 8, and where M is an alkali metal or ammonium cation. The fatty alcohol portion of the alcohol ethoxysulfate ($R^1$) is derived from a renewable source (e.g., animal or plant derived) rather than geologically derived (e.g., petroleum-derived). Fatty alcohols derived from a renewable source may be referred to as natural fatty alcohols. Natural fatty alcohols have an even number of carbon atoms with a single alcohol (—OH) attached to the terminal carbon. The fatty alcohol portion of the surfactant ($R^1$) may comprise distributions of even number carbon chains, e.g., C12, C14, C16, C18, and so forth.

In addition, a detergent composition may optionally contain 0 wt % to about 40 wt % of a nonionic surfactant such as alcohol ethoxylate (AEO or AE), carboxylated alcohol ethoxylates, nonylphenol ethoxylate, alkylpolyglycoside, alkyldimethylamineoxide, ethoxylated fatty acid monoethanolamide, fatty acid monoethanolamide, or polyhydroxy alkyl fatty acid amide. The detergent composition may comprise an alcohol ethoxylate of formula $R^2$—$(OCH_2CH_2)_y$—OH, wherein $R^2$ is a non-petroleum derived, linear or branched fatty alcohol consisting of even numbered carbon chain lengths of from about $C_{10}$ to about $C_{18}$, and wherein y is from about 0.5 to about 15. The fatty alcohol portion of the alcohol ethoxylate ($R^2$) is derived from a renewable source (e.g., animal or plant derived) rather than geologically derived (e.g., petroleum-derived). The fatty alcohol portion of the surfactant ($R^2$) may comprise distributions of even number carbon chains, e.g., C12, C14, C16, C18, and so forth.

The composition can further comprise one or more detergent builders or builder systems. In some embodiments incorporating at least one builder, the compositions comprise at least about 1%, from about 3% to about 60% or from about 5% to about 40% by weight of the builder, based on the total weight of the composition. Builders include, for example, the alkali metal, ammonium and/or alkanolammonium salts of polyphosphates, alkali metal silicates, alkaline earth and alkali metal carbonates, aluminosilicates, polycarboxylate compounds, ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, citric acid, oxydisuccinic acid, polymaleic acid, benzene 1,3,5-tricarboxylic acid, carboxymethyloxysuccinic acid, and soluble salts thereof. Examples of a detergent builder or complexing agent include zeolite, diphosphate, triphosphate, phosphonate, citrate, nitrilotriacetic acid (NTA), ethylenediaminetetraacetic acid (EDTA), diethylenetriaminepentaacetic acid (DTMPA), alkyl- or alkenylsuccinic acid, soluble silicates or layered silicates (e.g., SKS-6 from Hoechst). A detergent may also be unbuilt, i.e., essentially free of detergent builder.

The composition can further comprise at least one chelating agent. Suitable chelating agents include, for example, copper, iron and/or manganese chelating agents and mixtures thereof. In some embodiments in which at least one chelating agent is used, the compositions comprise from about 0.1% to about 15% or even from about 3.0% to about 10% by weight of the chelating agent, based on the total weight of the composition.

The composition can further comprise at least one deposition aid. Suitable deposition aids include, for example, polyethylene glycol, polypropylene glycol, polycarboxylate, soil release polymers such as polyterephthalic acid, clays such as kaolinite, montmorillonite, atapulgite, illite, bentonite, halloysite, or a combination thereof.

The composition can further comprise one or more dye transfer inhibiting agents. Suitable dye transfer inhibiting agents include, for example, polyvinylpyrrolidone polymers, polyamine N-oxide polymers, copolymers of N-vinylpyrrolidone and N-vinylimidazole, polyvinyloxazolidones, polyvinylimidazoles, manganese phthalocyanine, peroxidases, polyvinylpyrrolidone polymers, ethylene-diamine-tetraacetic acid (EDTA); diethylene triamine penta methylene phosphonic acid (DTPMP); hydroxy-ethane diphosphonic acid (HEDP); ethylenediamine N,N'-disuccinic acid (EDDS); methyl glycine diacetic acid (MGDA); diethylene triamine penta acetic acid (DTPA); propylene diamine tetraacetic acid (PDT A); 2-hydroxypyridine-N-oxide (HPNO); or methyl glycine diacetic acid (MGDA); glutamic acid N,N-diacetic acid (N,N-dicarboxymethyl glutamic acid tetrasodium salt (GLDA); nitrilotriacetic acid (NTA); 4,5-dihydroxy-m-benzenedisulfonic acid; citric acid and any salts thereof; N-hydroxyethylethylenediaminetriacetic acid (HEDTA), triethylenetetraaminehexaacetic acid (TTHA), N-hydroxyethyliminodiacetic acid (HEIDA), dihydroxyethylglycine (DHEG), ethylenediaminetetrapropionic acid (EDTP) and derivatives thereof or a combination thereof. In embodiments in which at least one dye transfer inhibiting agent is used, the compositions can comprise from about 0.0001% to about 10%, from about 0.01% to about 5%, or even from about 0.1% to about 3% by weight of the dye transfer inhibiting agent, based on the total weight of the composition.

The composition can further comprise silicates. Suitable silicates can include, for example, sodium silicates, sodium disilicate, sodium metasilicate, crystalline phyllosilicates or a combination thereof. In some embodiments, silicates can be present at a level of from about 1% to about 20% by weight, based on the total weight of the composition. In other embodiments, silicates can be present at a level of from about 5% to about 15% by weight, based on the total weight of the composition.

The composition can further comprise dispersants. Suitable water-soluble organic materials can include, for example, homo- or co-polymeric acids or their salts, in which the polycarboxylic acid comprises at least two carboxyl radicals separated from each other by not more than two carbon atoms.

The composition can further comprise one or more other types of polymers in addition to the present poly alpha-1,3-glucan, poly alpha-1,6-glucan, or poly alpha-1,3-1,6-glucan derivatives. Examples of other types of polymers useful herein include carboxymethyl cellulose (CMC), poly(vinylpyrrolidone) (PVP), polyethylene glycol (PEG), polyvinylalcohol (PVA), polycarboxylates such as polyacrylates, maleic/acrylic acid copolymers and lauryl methacrylate/acrylic acid copolymers.

The composition can further comprise a bleaching system. For example, the bleaching system can comprise an $H_2O_2$ source such as perborate, percarbonate, perhydrate salts, mono or tetra hydrate sodium salt of perborate, persulfate, perphosphate, persilicate, percarboxylic acids and salts, percarbonic acids and salts, perimidic acids and salts, peroxymonosulfuric acids and salts, sulfonated zinc phthalocyanines, sulfonated aluminum phthalocyanines, xanthene dyes which may be combined with a peracid-forming bleach activator such as, for example, dodecanoyl oxybenzene sulfonate, decanoyl oxybenzene sulfonate, decanoyl oxybenzoic acid or salts thereof, tetraacetylethylenediamine (TAED) or nonanoyloxybenzenesulfonate (NOBS). Alternatively, a bleaching system may comprise peroxyacids (e.g., amide, imide, or sulfone type peroxyacids). In other embodiments, the bleaching system can be an enzymatic bleaching system comprising perhydrolase. Combinations of any of the above may also be used.

The composition can further comprise conventional detergent ingredients such as fabric conditioners, clays, foam boosters, suds suppressors, anti-corrosion agents, soil-suspending agents, anti-soil redeposition agents, dyes, bactericides, tarnish inhibiters, optical brighteners, or perfumes. The pH of a detergent composition herein (measured in aqueous solution at use concentration) can be neutral or alkaline (e.g., pH of about 7.0 to about 11.0).

The composition can be a detergent composition and optionally, a heavy duty (all purpose) laundry detergent composition. In some embodiments, the detergent composition can comprise a detersive surfactant (10%-40% wt/wt), including an anionic detersive surfactant (selected from a group of linear or branched or random chain, substituted or unsubstituted alkyl sulphates, alkyl sulphonates, alkyl alkoxylated sulphate, alkyl phosphates, alkyl phosphonates, alkyl carboxylates, and/or mixtures thereof), and optionally non-ionic surfactant (selected from a group of linear or branched or random chain, substituted or unsubstituted alkyl alkoxylated alcohol, e.g., $C_8$-Cis alkyl ethoxylated alcohols and/or $C_6$-$C_{12}$ alkyl phenol alkoxylates), where the weight ratio of anionic detersive surfactant (with a hydrophilic index (HIc) of from 6.0 to 9) to non-ionic detersive surfactant is greater than 1:1. Suitable detersive surfactants also include cationic detersive surfactants (selected from a group of alkyl pyridinium compounds, alkyl quaternary ammonium compounds, alkyl quaternary phosphonium compounds, alkyl ternary sulphonium compounds, and/or mixtures thereof); zwitterionic and/or amphoteric detersive surfactants (selected from a group of alkanolamine sulphobetaines); ampholytic surfactants; semi-polar non-ionic surfactants and mixtures thereof.

The composition can be a detergent composition, optionally including, for example, a surfactancy boosting polymer consisting of amphiphilic alkoxylated grease cleaning polymers. Suitable amphiphilic alkoxylated grease cleaning polymers can include, for example, alkoxylated polymers having branched hydrophilic and hydrophobic properties, such as alkoxylated polyalkylenimines, random graft polymers comprising a hydrophilic backbone comprising monomers, for example, unsaturated C1-C6 carboxylic acids, ethers, alcohols, aldehydes, ketones, esters, sugar units, alkoxy units, maleic anhydride, saturated polyalcohols such as glycerol, and mixtures thereof; and hydrophobic side chain(s), for example, one or more $C_4$-$C_{25}$ alkyl groups, polypropylene, polybutylene, vinyl esters of saturated $C_1$-$C_6$ mono-carboxylic acids, $C_1$-$C_6$ alkyl esters of acrylic or methacrylic acid, and mixtures thereof.

Suitable heavy duty laundry detergent compositions can optionally include additional polymers such as soil release polymers (include anionically end-capped polyesters, for example SRP1, polymers comprising at least one monomer unit selected from saccharide, dicarboxylic acid, polyol and combinations thereof, in random or block configuration, ethylene terephthalate-based polymers and co-polymers thereof in random or block configuration, for example REPEL-O-TEX SF, SF-2 AND SRP6, TEXCARE SRA100, SRA300, SRN100, SRN170, SRN240, SRN300 AND SRN325, MARLOQUEST SL), anti-redeposition polymers, include carboxylate polymers, such as polymers comprising at least one monomer selected from acrylic acid, maleic acid (or maleic anhydride), fumaric acid, itaconic acid, aconitic acid, mesaconic acid, citraconic acid, methylenemalonic acid, and any mixture thereof, vinylpyrrolidone homopolymer, and/or polyethylene glycol, molecular weight in the range of from 500 to 100,000 Daltons (Da); and polymeric carboxylate (such as maleate/acrylate random copolymer or polyacrylate homopolymer). If present, soil release polymers can be included at 0.1 to 10% by weight, based on the total weight of the composition.

The heavy duty laundry detergent composition can optionally further include saturated or unsaturated fatty acids, preferably saturated or unsaturated $C_{12}$-$C_{24}$ fatty acids; deposition aids, for example, polysaccharides, cellulosic polymers, poly diallyl dimethyl ammonium halides (DADMAC), and co-polymers of DADMAC with vinyl pyrrolidone, acrylamides, imidazoles, imidazolinium halides, and mixtures thereof, in random or block configuration, cationic guar gum, cationic starch, cationic polyacylamides or a combination thereof. If present, the fatty acids and/or the deposition aids can each be present at 0.1% to 10% by weight, based on the total weight of the composition.

The detergent composition may optionally include silicone or fatty-acid based suds suppressors; hueing dyes, calcium and magnesium cations, visual signaling ingredients, anti-foam (0.001% to about 4.0% by weight, based on the total weight of the composition), and/or a structurant/thickener (0.01% to 5% by weight, based on the total weight of the composition) selected from the group consisting of diglycerides and triglycerides, ethylene glycol distearate, microcrystalline cellulose, microfiber cellulose, biopolymers, xanthan gum, gellan gum, and mixtures thereof).

The compositions disclosed herein can be in the form of a dishwashing detergent composition. Examples of dishwashing detergents include automatic dishwashing detergents (typically used in dishwasher machines) and handwashing dish detergents. A dishwashing detergent composition can be in any dry or liquid/aqueous form as disclosed herein, for example. Components that may be included in certain embodiments of a dishwashing detergent composition include, for example, one or more of a phosphate; oxygen- or chlorine-based bleaching agent; non-ionic surfactant; alkaline salt (e.g., metasilicates, alkali metal hydroxides, sodium carbonate); any active enzyme disclosed herein; anti-corrosion agent (e.g., sodium silicate); anti-foaming agent; additives to slow down the removal of glaze and patterns from ceramics; perfume; anti-caking agent (in granular detergent); starch (in tablet-based detergents); gelling agent (in liquid/gel based detergents); and/or sand (powdered detergents).

In addition to the polysaccharide derivative, dishwashing detergent compositions can comprise (i) a non-ionic surfactant, including any ethoxylated non-ionic surfactant, alcohol alkoxylated surfactant, epoxy-capped poly(oxyalkylated) alcohol, or amine oxide surfactant present in an amount from 0 to 10% by weight; (ii) a builder, in the range of about 5 to 60% by weight, including any phosphate builder (e.g., mono-phosphates, di-phosphates, tri-polyphosphates, other oligomeric-polyphosphates, sodium tripolyphosphate-STPP), any phosphate-free builder (e.g., amino acid-based compounds including methyl-glycine-diacetic acid [MGDA] and salts or derivatives thereof, glutamic-N,N-diacetic acid [GLDA] and salts or derivatives thereof, iminodisuccinic acid (IDS) and salts or derivatives thereof, carboxy methyl inulin and salts or derivatives thereof, nitrilotriacetic acid [NTA], diethylene triamine penta acetic acid [DTPA], B-alaninediacetic acid [B-ADA] and salts thereof), homopolymers and copolymers of poly-carboxylic acids and partially or completely neutralized salts thereof, monomeric polycarboxylic acids and hydroxycarboxylic acids and salts thereof in the range of 0.5 to 50% by weight, or sulfonated/carboxylated polymers in the range of about 0.1% to about 50% by weight; (iii) a drying aid in the range of about 0.1% to about 10% by weight (e.g., polyesters, especially anionic polyesters, optionally together with further monomers with 3 to 6 functionalities, for example, acid, alcohol or ester functionalities which are conducive to polycondensation, polycarbonate-, polyurethane- and/or polyurea-polyorganosiloxane compounds or precursor compounds thereof, particularly of the reactive cyclic carbonate and urea type); (iv) a silicate in the range from about 1% to about 20% by weight (e.g., sodium or potassium silicates such as sodium disilicate, sodium meta-silicate and crystalline phyllosilicates); (v) an inorganic bleach (e.g., perhydrate salts such as perborate, percarbonate, perphosphate, persulfate and persilicate salts) and/or an organic bleach, for example, organic peroxyacids such as diacyl- and tetraacylperoxides, especially diperoxydodecanedioic acid, diperoxytetradecanedioic acid, and diperoxyhexadecanedioic acid; (vi) a bleach activator, for example, organic peracid precursors in the range from about 0.1% to about 10% by weight and/or bleach catalyst (e.g., manganese triazacyclononane and related complexes; Co, Cu, Mn, and Fe bis-pyridylamine and related complexes; and pentamine acetate cobalt(III) and related complexes); (vii) a metal care agent in the range from about 0.1% to 5% by weight, for example, benzatriazoles, metal salts and complexes, and/or silicates; and/or (viii) any active enzyme disclosed herein in the range from about 0.01 to 5.0 mg of active enzyme per gram of automatic dishwashing detergent composition, and an enzyme stabilizer component. The percentages by weight are based on the total weight of the composition.

Various examples of detergent formulations comprising at least one polysaccharide derivative are disclosed below (1-21):

1) A detergent composition formulated as a granulate having a bulk density of at least 600 g/L comprising: linear alkylbenzenesulfonate (calculated as acid) at about 7 to 12% by weight; alcohol ethoxysulfate (e.g., $C_{12}$-$C_{18}$ alcohol, 1-2 ethylene oxide [EO]) or alkyl sulfate (e.g., $C_{16}$-$C_{18}$) at about 1 to 4% by weight; alcohol ethoxylate (e.g., $C_{14}$-$C_{15}$ alcohol) at about 5 to 9% by weight; sodium carbonate at about 14 to 20% by weight; soluble silicate (e.g., $Na_2O\ 2SiO_2$) at about 2 to 6% by weight; zeolite (e.g., $NaAlSiO_4$) at about 15 to 22% by weight; sodium sulfate at about 0 to 6% by weight; sodium citrate/citric acid at about 0 to 15% by weight; sodium perborate at about 11 to 18% by weight; TAED at about 2 to 6% by weight; polysaccharide derivative up to about 2% by weight; other polymers (e.g., maleic/acrylic acid copolymer, PVP, PEG) at about 0 to 3% by weight; optionally an enzyme(s) (calculated as pure enzyme protein) at about 0.0001 to 0.1% by weight; and minor ingredients (e.g., suds suppressors, perfumes, optical brightener, photobleach) at about 0 to 5% by weight.

2) A detergent composition formulated as a granulate having a bulk density of at least 600 g/L comprising: linear alkylbenzenesulfonate (calculated as acid) at about 6 to 11% by weight; alcohol ethoxysulfate (e.g., $C_{12}$-$C_{18}$ alcohol, 1-2 EO) or alkyl sulfate (e.g., $C_{16}$-$C_{18}$) at about 1 to 3% by weight; alcohol ethoxylate (e.g., $C_{14}$-$C_{15}$ alcohol) at about 5 to 9% by weight; sodium carbonate at about 15 to 21% by weight; soluble silicate (e.g., $Na_2O$ $2SiO_2$) at about 1 to 4% by weight; zeolite (e.g., $NaAlSiO_4$) at about 24 to 34% by weight; sodium sulfate at about 4 to 10% by weight; sodium citrate/citric acid at about 0 to 15% by weight; sodium perborate at about 11 to 18% by weight; TAED at about 2 to 6% by weight; polysaccharide derivative up to about 2% by weight; other polymers (e.g., maleic/acrylic acid copolymer, PVP, PEG) at about 1 to 6% by weight; optionally an enzyme(s) (calculated as pure enzyme protein) at about 0.0001 to 0.1% by weight; and minor ingredients (e.g., suds suppressors, perfumes, optical brightener, photobleach) at about 0 to 5% by weight.

3) A detergent composition formulated as a granulate having a bulk density of at least 600 g/L comprising: linear alkylbenzenesulfonate (calculated as acid) at about 5 to 9% by weight; alcohol ethoxysulfate (e.g., $C_{12}$-$C_{18}$ alcohol, 7 EO) at about 7 to 14% by weight; soap as fatty acid (e.g., $C_{16}$-$C_{22}$ fatty acid) at about 1 to 3% by weight; sodium carbonate at about 10 to 17% by weight; soluble silicate (e.g., $Na_2O$ $2SiO_2$) at about 3 to 9% by weight; zeolite (e.g., $NaAlSiO_4$) at about 23 to 33% by weight; sodium sulfate at about 0 to 4% by weight; sodium perborate at about 8 to 16% by weight; TAED at about 2 to 8% by weight; phosphonate (e.g., EDTMPA) at about 0 to 1% by weight; polysaccharide derivative up to about 2% by weight; other polymers (e.g., maleic/acrylic acid copolymer, PVP, PEG) at about 0 to 3% by weight; optionally an enzyme(s) (calculated as pure enzyme protein) at about 0.0001 to 0.1% by weight; and minor ingredients (e.g., suds suppressors, perfumes, optical brightener) at about 0 to 5% by weight.

4) A detergent composition formulated as a granulate having a bulk density of at least 600 g/L comprising: linear alkylbenzene sulfonate (calculated as acid) at about 8 to 12% by weight; alcohol ethoxylate (e.g., $C_{12}$-$C_{18}$ alcohol, 7 EO) at about 10 to 25% by weight; sodium carbonate at about 14 to 22% by weight; soluble silicate (e.g., $Na_2O$ $2SiO_2$) at about 1 to 5% by weight; zeolite (e.g., $NaAlSiO_4$) at about 25 to 35% by weight; sodium sulfate at about 0 to 10% by weight; sodium perborate at about 8 to 16% by weight; TAED at about 2 to 8% by weight; phosphonate (e.g., EDTMPA) at about 0 to 1% by weight; polysaccharide derivative up to about 2% by weight; other polymers (e.g., maleic/acrylic acid copolymer, PVP, PEG) at about 1 to 3% by weight; optionally an enzyme(s) (calculated as pure enzyme protein) at about 0.0001 to 0.1% by weight; and minor ingredients (e.g., suds suppressors, perfumes) at about 0 to 5% by weight.

5) An aqueous liquid detergent composition comprising: linear alkylbenzenesulfonate (calculated as acid) at about 15 to 21% by weight; alcohol ethoxylate (e.g., $C_{12}$-$C_{18}$ alcohol, 7 EO; or $C_{12}$-$C_{15}$ alcohol, 5 EO) at about 12 to 18% by weight; soap as fatty acid (e.g., oleic acid) at about 3 to 13% by weight; alkenylsuccinic acid ($C_{12}$-$C_{14}$) at about 0 to 13% by weight; aminoethanol at about 8 to 18% by weight; citric acid at about 2 to 8% by weight; phosphonate at about 0 to 3% by weight; polysaccharide derivative up to about 2% by weight; other polymers (e.g., PVP, PEG) at about 0 to 3% by weight; borate at about 0 to 2% by weight; ethanol at about 0 to 3% by weight; propylene glycol at about 8 to 14% by weight; optionally an enzyme(s) (calculated as pure enzyme protein) at about 0.0001 to 0.1% by weight; and minor ingredients (e.g., dispersants, suds suppressors, perfume, optical brightener) at about 0 to 5% by weight.

6) An aqueous structured liquid detergent composition comprising: linear alkylbenzenesulfonate (calculated as acid) at about 15 to 21% by weight; alcohol ethoxylate (e.g., $C_{12}$-$C_{18}$ alcohol, 7 EO; or $C_{12}$-$C_{15}$ alcohol, 5 EO) at about 3 to 9% by weight; soap as fatty acid (e.g., oleic acid) at about 3 to 10% by weight; zeolite (e.g., $NaAlSiO_4$) at about 14 to 22% by weight; potassium citrate about 9 to 18% by weight; borate at about 0 to 2% by weight; polysaccharide derivative up to about 2% by weight; other polymers (e.g., PVP, PEG) at about 0 to 3% by weight; ethanol at about 0 to 3% by weight; anchoring polymers (e.g., lauryl methacrylate/acrylic acid copolymer, molar ratio 25:1, MW 3800) at about 0 to 3% by weight; glycerol at about 0 to 5% by weight; optionally an enzyme(s) (calculated as pure enzyme protein) at about 0.0001 to 0.1% by weight; and minor ingredients (e.g., dispersants, suds suppressors, perfume, optical brightener) at about 0 to 5% by weight.

7) A detergent composition formulated as a granulate having a bulk density of at least 600 g/L comprising: fatty alcohol sulfate at about 5 to 10% by weight, ethoxylated fatty acid monoethanolamide at about 3 to 9% by weight; soap as fatty acid at about 0 to 3% by weight; sodium carbonate at about 5 to 10% by weight; soluble silicate (e.g., $Na_2O$ $2SiO_2$) at about 1 to 4% by weight; zeolite (e.g., $NaAlSiO_4$) at about 20 to 40% by weight; sodium sulfate at about 2 to 8% by weight; sodium perborate at about 12 to 18% by weight; TAED at about 2 to 7% by weight; polysaccharide derivative up to about 2% by weight; other polymers (e.g., maleic/acrylic acid copolymer, PEG) at about 1 to 5% by weight; optionally an enzyme(s) (calculated as pure enzyme protein) at about 0.0001 to 0.1% by weight; and minor ingredients (e.g., optical brightener, suds suppressors, perfumes) at about 0 to 5% by weight.

8) A detergent composition formulated as a granulate comprising: linear alkylbenzenesulfonate (calculated as acid) at about 8 to 14% by weight; ethoxylated fatty acid monoethanolamide at about 5 to 11% by weight; soap as fatty acid at about 0 to 3% by weight; sodium carbonate at about 4 to 10% by weight; soluble silicate (e.g., $Na_2O$ $2SiO_2$) at about 1 to 4% by weight; zeolite (e.g., $NaAlSiO_4$) at about 30 to 50% by weight; sodium sulfate at about 3 to 11% by weight; sodium citrate at about 5 to 12% by weight; polysaccharide derivative up to about 2% by weight; other polymers (e.g., PVP, maleic/acrylic acid copolymer, PEG) at about 1 to 5% by weight; optionally an enzyme(s) (calculated as pure enzyme protein) at about 0.0001 to 0.1% by weight; and minor ingredients (e.g., suds suppressors, perfumes) at about 0 to 5% by weight.

9) A detergent composition formulated as a granulate comprising: linear alkylbenzenesulfonate (calculated as acid) at about 6 to 12% by weight; nonionic surfactant at about 1 to 4% by weight; soap as fatty acid at about 2 to 6% by weight; sodium carbonate at about 14 to 22% by weight; zeolite (e.g., $NaAlSiO_4$) at about 18 to 32% by weight;

sodium sulfate at about 5 to 20% by weight; sodium citrate at about 3 to 8% by weight; sodium perborate at about 4 to 9% by weight; bleach activator (e.g., NOBS or TAED) at about 1 to 5% by weight; polysaccharide derivative up to about 2% by weight; other polymers (e.g., polycarboxylate or PEG) at about 1 to 5% by weight; optionally an enzyme(s) (calculated as pure enzyme protein) at about 0.0001 to 0.1% by weight; and minor ingredients (e.g., optical brightener, perfume) at about 0 to 5% by weight.

10) An aqueous liquid detergent composition comprising: linear alkylbenzenesulfonate (calculated as acid) at about 15 to 23% by weight; alcohol ethoxysulfate (e.g., $C_{12-15}$ alcohol, 2-3 EO) at about 8 to 15% by weight; alcohol ethoxylate (e.g., $C_{12-15}$ alcohol, 7 EO; or $C_{12-15}$ alcohol, 5 EO) at about 3 to 9% by weight; soap as fatty acid (e.g., lauric acid) at about 0 to 3% by weight; aminoethanol at about 1 to 5% by weight; sodium citrate at about 5 to 10% by weight; hydrotrope (e.g., sodium cumene sulfonate) at about 2 to 6% by weight; borate at about 0 to 2% by weight; polysaccharide derivative up to about 1% by weight; ethanol at about 1 to 3% by weight; propylene glycol at about 2 to 5% by weight; optionally an enzyme(s) (calculated as pure enzyme protein) at about 0.0001 to 0.1% by weight; and minor ingredients (e.g., dispersants, perfume, optical brighteners) at about 0 to 5% by weight.

11) An aqueous liquid detergent composition comprising: linear alkylbenzenesulfonate (calculated as acid) at about 20 to 32% by weight; alcohol ethoxylate (e.g., $C_{12}$-$C_{15}$ alcohol, 7 EO; or $C_{12}$-$C_{15}$ alcohol, 5 EO) at about 6 to 12% by weight; aminoethanol at about 2 to 6% by weight; citric acid at about 8 to 14% by weight; borate at about 1 to 3% by weight; polysaccharide derivative up to about 2% by weight; ethanol at about 1 to 3% by weight; propylene glycol at about 2 to 5% by weight; other polymers (e.g., maleic/acrylic acid copolymer, anchoring polymer such as lauryl methacrylate/acrylic acid copolymer) at about 0 to 3% by weight; glycerol at about 3 to 8% by weight; optionally an enzyme(s) (calculated as pure enzyme protein) at about 0.0001 to 0.1% by weight; and minor ingredients (e.g., hydrotropes, dispersants, perfume, optical brighteners) at about 0 to 5% by weight.

12) A detergent composition formulated as a granulate having a bulk density of at least 600 g/L comprising: anionic surfactant (e.g., linear alkylbenzenesulfonate, alkyl sulfate, alpha-olefinsulfonate, alpha-sulfo fatty acid methyl esters, alkanesulfonates, soap) at about 25 to 40% by weight; nonionic surfactant (e.g., alcohol ethoxylate) at about 1 to 10% by weight; sodium carbonate at about 8 to 25% by weight; soluble silicate (e.g., $Na_2O$ $2SiO_2$) at about 5 to 15% by weight; sodium sulfate at about 0 to 5% by weight; zeolite ($NaAlSiO_4$) at about 15 to 28% by weight; sodium perborate at about 0 to 20% by weight; bleach activator (e.g., TAED or NOBS) at about 0 to 5% by weight; polysaccharide derivative up to about 2% by weight; optionally an enzyme(s) (calculated as pure enzyme protein) at about 0.0001 to 0.1% by weight; and minor ingredients (e.g., perfume, optical brighteners) at about 0 to 3% by weight.

13) Detergent compositions as described in (1)-(12) above, but in which all or part of the linear alkylbenzenesulfonate is replaced by $C_{12}$-$C_{18}$ alkyl sulfate.

14) A detergent composition formulated as a granulate having a bulk density of at least 600 g/L comprising: $C_{12}$-$C_{18}$ alkyl sulfate at about 9 to 15% by weight; alcohol ethoxylate at about 3 to 6% by weight; polyhydroxy alkyl fatty acid amide at about 1 to 5% by weight; zeolite (e.g., $NaAlSiO_4$) at about 10 to 20% by weight; layered disilicate (e.g., SK56 from Hoechst) at about 10 to 20% by weight; sodium carbonate at about 3 to 12% by weight; soluble silicate (e.g., $Na_2O$ $2SiO_2$) at 0 to 6% by weight; sodium citrate at about 4 to 8% by weight; sodium percarbonate at about 13 to 22% by weight; TAED at about 3 to 8% by weight; polysaccharide derivative up to about 2% by weight; other polymers (e.g., polycarboxylates and PVP) at about 0 to 5% by weight; optionally an enzyme(s) (calculated as pure enzyme protein) at about 0.0001 to 0.1% by weight; and minor ingredients (e.g., optical brightener, photobleach, perfume, suds suppressors) at about 0 to 5% by weight.

15) A detergent composition formulated as a granulate having a bulk density of at least 600 g/L comprising: $C_{12}$-$C_{18}$ alkyl sulfate at about 4 to 8% by weight; alcohol ethoxylate at about 11 to 15% by weight; soap at about 1 to 4% by weight; zeolite MAP or zeolite A at about 35 to 45% by weight; sodium carbonate at about 2 to 8% by weight; soluble silicate (e.g., $Na_2O$ $2SiO_2$) at 0 to 4% by weight; sodium percarbonate at about 13 to 22% by weight; TAED at about 1 to 8% by weight; polysaccharide derivative up to about 3% by weight; other polymers (e.g., polycarboxylates and PVP) at about 0 to 3% by weight; optionally an enzyme(s) (calculated as pure enzyme protein) at about 0.0001 to 0.1% by weight; and minor ingredients (e.g., optical brightener, phosphonate, perfume) at about 0 to 3% by weight.

16) Detergent formulations as described in (1) to (15) above, but that contain a stabilized or encapsulated peracid, either as an additional component or as a substitute for an already specified bleach system(s).

17) Detergent compositions as described in (1), (3), (7), (9) and (12) above, but in which perborate is replaced by percarbonate.

18) Detergent compositions as described in (1), (3), (7), (9), (12), (14) and (15) above, but that additionally contain a manganese catalyst. A manganese catalyst, for example, is one of the compounds described by Hage et al. (1994, *Nature* 369:637-639), which is incorporated herein by reference.

19) Detergent compositions formulated as a non-aqueous detergent liquid comprising a liquid non-ionic surfactant, for example, a linear alkoxylated primary alcohol, a builder system (e.g., phosphate), polysaccharide derivative, optionally an enzyme(s), and alkali. The detergent may also comprise an anionic surfactant and/or bleach system.

20) An aqueous liquid detergent composition comprising: non-petroleum-derived alcohol ethoxysulfate (e.g., $C_{12}$ alcohol, 1 EO) sodium sulfate at about 30 to 45% by weight; non-petroleum-derived alcohol ethoxylate (e.g., $C_{12}$-$C_{14}$ alcohol, 9 EO) at about 3 to 10% by weight; soap as fatty acid (e.g., $C_{12-18}$) at about 1 to 5% by weight; propylene glycol at about 5-12% by weight; $C_{12-14}$ alkyl amineoxide at about 4 to 8% by weight; citric acid at about 2 to 8% by weight; polysaccharide derivative up to about 4% by weight; other polymers (e.g., PVP, PEG) at about 0 to 3% by weight; borate at about 0 to 4% by weight; ethanol at about 0 to 3% by weight; optionally an enzyme(s) (calculated as pure enzyme protein) at about 0.0001 to 0.3% by weight; and minor ingredients (e.g., dispersants, suds suppressors, perfume, optical brightener, stabilizers) at about 0 to 5% by weight and the balance being water.

21) A water-soluble unit dose detergent composition comprising: alcohol ethoxysulfate (e.g., $C_{12-15}$ alcohol, 2-3 EO) sodium sulfate at about 10 to 25% by weight; linear alkylbenzenesulfonate (calculated as acid) at about 15 to 25% by weight; alcohol ethoxylate (e.g., $C_{12-14}$ alcohol, 9 EO) at about 0.5 to 10% by weight; alcohol ethoxylate (e.g., $C_{12-15}$ alcohol, 7 EO) at about 0.5 to 10% by weight; soap as fatty acid (e.g., $C_{12-18}$) at about 1 to 8% by weight; propylene glycol at about 6 to 15% by weight; citric acid at about 0.5 to 8% by weight; polysaccharide derivative up to about 4% by weight; monoethanolamine at about 5 to 10% by weight, other polymers (e.g., PVP, PEG, PVOH) at about 0 to 3% by weight; dipropyleneglycol at about 2 to 6%, glycerine at about 2 to 5% by weight; optionally an enzyme(s) (calculated as pure enzyme protein) at about 0.0001 to 0.3% by weight; and minor ingredients (e.g., dispersants, suds suppressors, perfume, optical brightener, stabilizers) at about 0 to 5% by weight and the balance being water.

In other embodiments, the disclosure relates to a method for treating a substrate, the method comprising the steps:
  A) providing a product comprising a polysaccharide derivative, wherein the polysaccharide derivative comprises a polysaccharide substituted with at least one of:
    a) at least one sulfate group;
    b) at least one sulfonate group;
    c) at least one thiosulfate group; or
    d) a combination thereof;
wherein the polysaccharide is poly alpha-1,3-glucan, poly alpha-1,6-glucan, poly alpha-1,3-1,6-glucan or a mixture thereof, and the polysaccharide derivative has a degree of substitution of about 0.001 to about 3;
  B) contacting the substrate with the product; and
  C) optionally rinsing the substrate;
wherein the substrate is a textile, a fabric, carpet, upholstery, apparel, or a surface. Optionally, the step of contacting the substrate can be performed in the presence of water.

In one embodiment, the method of treating the substrate can impart anti-greying properties to the substrate, by which is meant that soil which is detached from a fabric during washing of the fabric is suspended in the wash liquor and thus prevented from being redeposited on the fabric. In another embodiment, the method of treating the substrate can impart anti-redeposition properties to a substrate. The effectiveness of anti-greying and anti-redeposition agents can be determined with the use of a tergotometer and multiple washings of pre-soiled fabrics in the presence of initially clean fabrics which act as redeposition monitors, for example using methods known in the art.

In one embodiment, the substrate can be a textile, a fabric, carpet, or apparel. In another embodiment, the substrate can be carpet, upholstery, or a surface. In yet another embodiment, the substrate can be a textile, a fabric, carpet, upholstery, apparel, or a surface. By "upholstery" is meant the soft, padded textile covering that is fixed to furniture such as armchairs and sofas. The treatment provides a benefit to the substrate, for example, one or more of improved fabric hand, improved resistance to soil deposition, improved colorfastness, improved wear resistance, improved wrinkle resistance, improved antifungal activity, improved stain resistance, improved cleaning performance when laundered, improved drying rates, improved dye, pigment or lake update, improved whiteness retention, or a combination thereof. In another embodiment, the substrate can be a surface, for example a wall, a floor, a door, or a panel, or paper, or the substrate can be a surface of an object, such as a table. The treatment provides a benefit to the substrate, for example improved resistance to soil deposition, improved stain resistance, improved cleaning performance, or a combination thereof.

A fabric herein can comprise natural fibers, synthetic fibers, semi-synthetic fibers, or any combination thereof. A semi-synthetic fiber is produced using naturally occurring material that has been chemically derivatized, an example of which is rayon. Non-limiting examples of fabric types herein include fabrics made of (i) cellulosic fibers such as cotton (e.g., broadcloth, canvas, chambray, chenille, chintz, corduroy, cretonne, damask, denim, flannel, gingham, jacquard, knit, matelassé, oxford, percale, poplin, plissé, sateen, seersucker, sheers, terry cloth, twill, velvet), rayon (e.g., viscose, modal, lyocell), linen, and TENCEL®; (ii) proteinaceous fibers such as silk, wool and related mammalian fibers; (iii) synthetic fibers such as polyester, acrylic, nylon, and the like; (iv) long vegetable fibers from jute, flax, ramie, coir, kapok, sisal, henequen, abaca, hemp and sunn; and (v) any combination of a fabric of (i)-(iv). Fabric comprising a combination of fiber types (e.g., natural and synthetic) includes those with both a cotton fiber and polyester, for example. Materials/articles containing one or more fabrics include, for example, clothing, curtains, drapes, upholstery, carpeting, bed linens, bath linens, tablecloths, sleeping bags, tents, car interiors, etc. Other materials comprising natural and/or synthetic fibers include, for example, non-woven fabrics, paddings, paper, and foams. Fabrics are typically of woven or knit construction.

The step of contacting can be performed at a variety of conditions, for example, times, temperatures, wash/rinse volumes. Methods for contacting a fabric or textile substrate, for example, a fabric care method or laundry method are generally well known. For example, a material comprising fabric can be contacted with the disclosed composition: (i) for at least about 5, 10, 20, 30, 40, 50, 60, 70, 80, 90, 100, 110, or 120 minutes; (ii) at a temperature of at least about 10, 15, 20, 25, 30, 35, 40, 45, 50, 55, 60, 65, 70, 75, 80, 85, 90, or 95° C. (e.g., for laundry wash or rinse: a "cold" temperature of about 15-30° C., a "warm" temperature of about 30-50° C., a "hot" temperature of about 50-95° C.); (iii) at a pH of about 2, 3, 4, 5, 6, 7, 8, 9, 10, 11, or 12 (e.g., pH range of about 2-12, or about 3-11); (iv) at a salt (e.g., NaCl) concentration of at least about 0.5, 1.0, 1.5, 2.0, 2.5, 3.0, 3.5, or 4.0% by weight; or any combination of (i)-(iv). The contacting step in a fabric care method or laundry method can comprise any of washing, soaking, and/or rinsing steps, for example. In some embodiments, the rinsing step is a step of rinsing with water.

Other substrates that can be contacted include, for example, surfaces that can be treated with a dish detergent (e.g., automatic dishwashing detergent or hand dish detergent). Examples of such materials include surfaces of dishes, glasses, pots, pans, baking dishes, utensils and flatware made from ceramic material, china, metal, glass, plastic (e.g., polyethylene, polypropylene, and polystyrene) and wood (collectively referred to herein as "tableware"). Examples of conditions (e.g., time, temperature, wash volume) for conducting a dishwashing or tableware washing method are known in the art. In other examples, a tableware article can be contacted with the composition herein under a suitable set of conditions such as any of those disclosed above with regard to contacting a fabric-comprising material.

Certain embodiments of a method of treating a substrate further comprise a drying step, in which a material is dried after being contacted with the composition. The drying step can be performed directly after the contacting step, or following one or more additional steps that might follow the contacting step, for example, drying of a fabric after being rinsed, in water for example, following a wash in an aqueous composition. Drying can be performed by any of several means known in the art, such as air drying at a temperature of at least about 30, 40, 50, 60, 70, 80, 90, 100, 120, 140, 160, 170, 175, 180, or 200° C., for example. A material that has been dried herein typically has less than 3, 2, 1, 0.5, or 0.1 wt % water comprised therein.

In another embodiment, the substrate can be a surface, for example a wall, a floor, a door, or a panel, or the substrate can be a surface of an object, such as a table. The treatment provides a benefit to the substrate, for example improved resistance to soil deposition, improved stain resistance, improved cleaning performance, or a combination thereof. The step of contacting can include wiping or spraying the substrate with the composition.

Non-limiting examples of the embodiments disclosed herein include:

1. A product comprising a polysaccharide derivative wherein the polysaccharide derivative comprises a polysaccharide substituted with at least one of:
   a) at least one sulfate group;
   b) at least one sulfonate group;
   c) at least one thiosulfate group; or
   d) a combination thereof;
wherein the polysaccharide is poly alpha-1,3-glucan, poly alpha-1,6-glucan, poly alpha-1,3-1,6-glucan, or a mixture thereof, and the polysaccharide derivative has a degree of substitution of about 0.001 to about 3, and wherein the product is a fabric care product and/or a home care product.

2. The product of embodiment 1, wherein the polysaccharide is poly alpha-1,3-glucan, and the poly alpha-1,3-glucan comprises a backbone of glucose monomer units wherein greater than or equal to 50% of the glucose monomer units are linked via alpha-1,3-glycosidic linkages.

3. The product of any of embodiments 1-2, wherein the polysaccharide is poly alpha-1,3-glucan, and the poly alpha-1,3-glucan comprises a backbone of glucose monomer units wherein greater than or equal to 90% of the glucose monomer units are linked via alpha-1,3-glycosidic linkages.

4. The product of any of embodiments 1-3, wherein the polysaccharide is poly alpha-1,6-glucan, and the poly alpha-1,6-glucan comprises a backbone of glucose monomer units wherein greater than or equal to 40% of the glucose monomer units are linked via alpha-1,6-glycosodic linkages.

5. The product of any of embodiments 1-4, wherein the polysaccharide is poly alpha-1,6-glucan, and the poly alpha-1,6-glucan has a degree of alpha-1,2-branching that is less than 50%.

6. The product of any of embodiments 1-5, wherein the polysaccharide is poly alpha-1,3-1,6-glucan, wherein (i) at least 30% of the glycosidic linkages of the poly alpha-1,3-1,6-glucan are alpha-1,3 linkages, (ii) at least 30% of the glycosidic linkages of the poly alpha-1,3-1,6-glucan are alpha-1,6 linkages, (iii) the poly alpha-1,3-1,6-glucan has a weight average degree of polymerization ($DP_w$) of at least 10; and (iv) the alpha-1,3 linkages and alpha-1,6 linkages of the poly alpha-1,3-1,6-glucan do not consecutively alternate with each other.

7. The product of any of embodiments 1-6, wherein the at least one sulfate group is sulfate or an alkyl sulfate.

8. The product of any of embodiments 1-7, wherein the at least one sulfonate group is an alkyl sulfonate.

9. The product of any of embodiments 1-8, wherein the alkyl sulfonate is 1,3-propanesultone and/or 1,4-butanesultone.

10. The product of any of embodiments 1-9, wherein the at least one sulfonate group is ethyl sulfonate, propyl sulfonate, butyl sulfonate, or a combination thereof.

11. The product of any of embodiments 1-10, wherein the polysaccharide is substituted with at least one sulfate group and at least one sulfonate group.

12. The product of any of embodiments 1-11, wherein the polysaccharide is substituted with at least one sulfonate group and at least one thiosulfate group.

13. The product of any of embodiments 1-12, wherein the polysaccharide is substituted with at least one sulfate group; at least one sulfonate group; and at least one thiosulfate group.

14. The product of any of embodiments 1-13, wherein the polysaccharide derivative has a weight average degree of polymerization in the range of from about 5 to about 1400.

15. The product of any of embodiments 1-14, wherein the product is in the form of a liquid, a gel, a powder, a hydrocolloid, an aqueous solution, a granule, a tablet, a capsule, a single compartment sachet, a multi-compartment sachet, a single compartment pouch, or a multi-compartment pouch.

16. The product of any of embodiments 1-15, further comprising at least one of a surfactant, an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil re-deposition agent, a dye, a bactericide, a tarnish inhibitor, an optical brightener, a perfume, a saturated or unsaturated fatty acid, a dye transfer inhibiting agent, a chelating agent, a hueing dye, a calcium cation, a magnesium cation, a visual signaling ingredient, an anti-foam, a structurant, a thickener, an anti-caking agent, a starch, sand, a gelling agent, or a combination thereof.

17. The product of any of embodiments 1-16, wherein the product comprises an enzyme that is selected from a cellulase, a protease, an amylase, a lipase, or a combination thereof.

18. The product of any of embodiments 1-17, wherein the product is a liquid laundry detergent product, and wherein the product comprises an anionic detersive surfactant.

19. The product of any of embodiments 1-17, wherein the product is a water-soluble unit dose laundry detergent product in the form of a water-soluble pouch, and wherein the product comprises an anionic detersive surfactant.

20. The product of any of embodiments 1-17, wherein the product is a laundry powder detergent product, and wherein the product comprises an anionic detersive surfactant.

21. The product of any of embodiments 1-17, wherein the product is a fabric enhancer product, and wherein the product comprises a fabric-softening ingredient.

22. A method for treating a substrate, the method comprising the steps:
   A) providing a product of any of embodiments 1-21;
   B) contacting the substrate with the product; and
   C) optionally rinsing the substrate;
wherein the substrate is a textile, a fabric, carpet, upholstery, apparel, or a surface.

EXAMPLES

Unless otherwise stated, all ingredients are available from Sigma-Aldrich, St. Louis, Mo. and were used as received.

As used herein, "Comp. Ex." Means Comparative Example; "Ex." means Example; "std dev" means standard deviation; "g" means gram(s); "L" meant liter(s); "mL" means milliliter(s); "uL" means microliter(s); "wt" means weight; "L" means liter(s); "min" means minute(s); "kDa" or "K" means kilodaltons; "PES" means polyethersulfone.

Representative Preparation of Poly Alpha-1,3-Glucan

Poly alpha-1,3-glucan can be prepared using a gtfJ enzyme preparation as described in U.S. Pat. No. 7,000,000; U.S. Patent Appl. Publ. No. 2013/0244288, now U.S. Pat. No. 9,080,195; and U.S. Patent Appl. Publ. No. 2013/0244287, now U.S. Pat. No. 8,642,757 (all of which are incorporated herein by reference in their entirety).

Poly alpha-1,3-glucan polymer can be synthesized, and wet cake thereof prepared, following the procedures disclosed in U.S. Appl. Publ. No. 2014/0179913, now U.S. Pat. No. 9,139,718 (see Example 12 therein, for example), both of which are incorporated herein by reference in their entirety.

Preparation of Poly Alpha-1,6-Glucan with 31.8% Alpha 1,2 Branching Soluble α-(1,2)-branched poly alpha-1,6-glucan was prepared using stepwise combination of glucosyltransferase GTF8117 and α-(1,2) branching enzyme GTF9905, according to the following procedure. The material contained 31.8% alpha-1,2-branching and had a molecular weight of 17K.

A reaction mixture (2 L) comprised of sucrose (450 g/L), GTF8117 (2%, V %), and 50 mM sodium acetate was adjusted to pH 5.5 and stirred at 47° C. Aliquots (0.2-1 mL) were withdrawn at predetermined times and quenched by heating at 90° C. for 15 min. The resulting heat-treated aliquots were passed through 0.45 µm filter. The flow through was analyzed by HPLC to determine the concentration of sucrose, glucose, fructose, leucrose, oligosaccharides and polysaccharides. After 20 h, the reaction mixture was heated to 90° C. for 30 minutes. An aliquot of the heat-treated reaction mixture was passed through 0.45 µm filter and the flow through was analyzed for soluble mono/disaccharides, oligosaccharides, and polysaccharides (Table 1).

TABLE 1

HPLC Analysis of Soluble Mono/Disaccharides, Oligosaccharides, and Polysaccharides Produced by GTF8117 Reaction.

| DP8+ g/L | DP7 g/L | DP6 g/L | DP5 g/L | DP4 g/L | DP3 g/L | DP2 g/L | Sucrose g/L | Leucrose g/L | Glucose g/L | Fructose g/L |
|---|---|---|---|---|---|---|---|---|---|---|
| 197.2 | 0.0 | 0.0 | 0.0 | 0.0 | 0.0 | 0.6 | 3.9 | 21.2 | 2.7 | 217.1 |

A second reaction mixture was prepared by adding 524.1 g of sucrose and 60 mL of α-(1,2)-branching enzyme GTF9905 to the leftover heat-treated reaction mixture that was obtained from the sucrose and GTF8117 reaction described immediately above. The mixture was stirred at 30° C. with a volume of ~2.1 L. Aliquots (0.2-1 mL) were withdrawn at predetermined times and quenched by heating at 90° C. for 15 min. The resulting heat-treated aliquots were passed through 0.45 µm filter. The flow through was analyzed by HPLC to determine the concentration of sucrose, glucose, fructose, leucrose, oligosaccharides and polysaccharides. After 48 h, the reaction mixture was heated to 90° C. for 30 minutes. An aliquot of the heat-treated reaction mixture was passed through 0.45 µm filter and the flow through was analyzed for soluble mono/disaccharides, oligosaccharides, and polysaccharides (Table 2). Leftover heat-treated mixture was centrifuged using 1 L centrifugation bottles. The supernatant was collected and cleaned more than 100-fold using ultrafiltration system with 1 or 5 KDa MWCO cassettes and deionized water. The cleaned oligo/polysaccharide product solution was dried. Dry sample was then analyzed by NMR spectroscopy to determine the anomeric linkages of the oligosaccharides and polysaccharides (Table 3). The column headings of Table 3 are the linkage descriptions, in which the single digits immediately preceding and following the comma indicate the actual glycosidic linkage, and any following number indicates the position of additional substitution (branching) on the backbone linkage.

TABLE 2

HPLC Analysis of Soluble Mono/Disaccharides, Oligosaccharides and Polysaccharides Produced by α-(1,2) Branching Reaction.

| DP8+ g/L | DP7 g/L | DP6 g/L | DP5 g/L | DP4 g/L | DP3 g/L | DP2 g/L | Sucrose g/L | Leucrose g/L | Glucose g/L | Fructose g/L |
|---|---|---|---|---|---|---|---|---|---|---|
| 257.7 | 0.0 | 0.5 | 0.9 | 0.0 | 1.8 | 8.1 | 4.7 | 56.4 | 9.2 | 271.9 |

TABLE 3

Anomeric Linkage Analysis of Soluble Oligosaccharides and Polysaccharides by $^1$H NMR Spectroscopy.

| % α-(1,4) | % α-(1,3) | % α-(1,63) | % α-(1,62) | % α-(1,6) | % α-(1,2) |
|---|---|---|---|---|---|
| 0.0 | 0.1 | 0.0 | 31.8 | 36.4 | 31.8 |

Method for Determining Anomeric Linkages by NMR Spectroscopy

Glycosidic linkages in water soluble oligosaccharides and polysaccharide products synthesized by a glucosyltransferase GTF8117 and alpha-1,2 branching enzyme were determined by $^1$H NMR (Nuclear Magnetic Resonance Spectroscopy). Dry oligosaccharide/polysaccharide polymer (6 mg to 8 mg) was dissolved in a solution of 0.7 mL of 1 mM DSS (4,4-dimethyl-4-silapentane-1-sulfonic acid; NMR reference standard) in $D_2O$. The sample was stirred at ambient temperature overnight. 525 uL of the clear homogeneous solution was transferred to a 5 mm NMR tube. 2D $^1$H, $^{13}$C homo/hetero-nuclear suite of NMR experiments were used to identify AGU (anhydroglucose unit) linkages. The data were collected at 20° C. and processed on a Bruker Advance III NMR spectrometer, operating at either 500 MHz or 600 MHz. The systems are equipped with a proton optimized, helium cooled cryoprobe. The 1D $^1$H NMR spectrum was used to quantify glycosidic linkage distribution (Table 3) and finds the polysaccharide backbone as primarily alpha (1,6) AGU [alpha(1,6)+alpha(1,62)=68.2% total glycosidic linkages as alpha(1,6)] with 31.8% of the total AGU as alpha(1,2) as branched. The results reflect the ratio of the integrated intensity of a NMR resonance representing an individual linkage type divided by the integrated intensity of the sum of all peaks which represent glucose linkages, multiplied by 100.

Example 1

Reaction of Poly Alpha-1,6-Glucan with Sodium Vinyl Sulfonic Acid

This example describes poly alpha-1,6 glucan functionalized with an ethylsulfonate group. Poly alpha-1,6 glucan (20 g) prepared as described herein above was suspended in 200 mL isopropanol in a 1 L round bottom equipped with an overhead stirrer, addition funnel, and nitrogen inlet. To this was added sodium vinyl sulfonic acid (187 mL of 25 wt % solution) and the mixture was stirred for 10 min. To this was added 59 g 50 wt % sodium hydroxide. The mixture was stirred for 1 hour at room temperature. The mixture was then heated to 80° C. for 5 hours with stirring. The mixture was cooled to room temperature and neutralized with 18.5 wt % HCl. The product was purified by ultrafiltration (MWCO 5 kDa, PES membrane). The degree of substitution was 1.0, as determined by $^1$H NMR analysis.

Example 2

Reaction of Poly Alpha-1,6-Glucan with 1,3-Propanesultone.

This example describes poly alpha-1,6 glucan functionalized with a propyl sulfonate group. Poly alpha-1,6 glucan (20 g) prepared as described herein above was dissolved in 50 mL distilled, deionized water in a 1 L round bottom equipped with an overhead stirrer, addition funnel, and nitrogen inlet. The mixture was cooled with ice/water bath. To this was added 9.9 g 50 wt % sodium hydroxide solution via the addition funnel under a nitrogen sweep. After addition, the mixture was further stirred over ice/water for 30 min. To this was added 14.6 g 1,3-propanesultone. The mixture was heated at 45-50° C. for 3 hours under nitrogen. The mixture was cooled and neutralized with 18.5 wt % HCl. The product was purified by ultrafiltration (MWCO 5K, PES membrane, 3X). The degree of substitution was 0.3 as determined by $^1$H NMR analysis.

Example 3

Reaction of Poly Alpha-1,6-Glucan with 1,4-Butane Sultone.

This example describes poly alpha-1,6 glucan functionalized with a butyl sulfonate group. Poly alpha-1,6 glucan (20 g) prepared as described herein above was dissolved with 50 mL distilled, deionized water in a 1 L round bottom equipped with an overhead stirrer, addition funnel, and nitrogen inlet. The mixture was cooled with ice/water bath. To this was added 7.4 g 50 wt % sodium hydroxide solution via the addition funnel under a nitrogen sweep. After addition, the mixture was further stirred over ice/water for 30 min. To this was added 16 g 1,4-butane sultone. The mixture was heated at 40-45° C. for 2 days under nitrogen. The mixture was cooled and neutralized with 18.5 wt % HCl. The polymer was purified by ultrafiltration (MWCO 5K, PES membrane, 3X). The degree of substitution was 0.8 as determined by $^1$H NMR analysis.

Example 4

Reaction of Poly alpha-1,3-Glucan with Sodium Vinyl Sulfonic Acid

This example describes poly alpha-1,3 glucan functionalized with an ethylsulfonate group. Poly alpha-1,3-glucan, (20 g) is suspended in 200 mL isopropanol in a 1 L round bottom equipped with an overhead stirrer, addition funnel and nitrogen inlet. To this is added sodium vinyl sulfonic acid (187 mL of 25 wt % solution) and the mixture is stirred for 10 min. To this is added 59 g 50 wt % sodium hydroxide. The mixture is stirred for 1 hour at room temperature. The mixture is then heated to 80° C. for 5 hours with stirring. The mixture is cooled to room temperature and neutralized with 18.5 wt % HCl. The product is filtered and is purified by ultrafiltration (MWCO 5 kDa, PES membrane).

Example 5

Evaluation of Whiteness Performance of Sulfonated Polysaccharide

Method for Evaluating Whiteness Benefit of Polymers (Tergotometer)

Two kinds of fabric swatches were used, including a polyester/cotton fabric EMPA213 and a cotton fabric EMPA221, both from Testfabrics. Each kind of fabric swatch was a 2"×2" square; 3 swatches of each fabric were used per test. Detergent used in this set of experiments was AATCC WOB liquid. Red #1 C-red clay was used as a hydrophilic stain; a total of 0.6 g of C-red clay was used in each test. Carbon black was used as a hydrophobic stain; a total of 0.2 g of carbon black was used in each test. The following washing conditions have been applied: 0.5 L tap water (100 ppm hardness); 125 mg of polysaccharide derivative; 100 rpm agitation; 35° C. wash temp; 10 minute wash with 5 minute rinse.

After the experiment, the swatches were air dried overnight and the color of the resulting swatches was measured using a X-Rite colorimeter (L*, a*, b*) in duplicate. The L* values were used to determine cleaning efficacy. Delta L* was calculated to indicate the color differences between the swatches tested with the polysaccharide derivative and that with water control (no polysaccharide derivative added). The larger value indicates better anti re-deposition of the polysaccharide derivative against the stain that was applied. Results are shown in Table 4.

TABLE 4

Laundry Testing Results

| Example No. | Polysaccharide Derivative | Stain | Delta L* Cotton EMPA221 (std dev) | Delta L* Polyester/ cotton EMPA213 (std dev) |
|---|---|---|---|---|
| Comp. Ex. A | None | #1 C-Red Clay | 0 (0.4) | 0 (0.5) |
| 5-1 | of Example 3 | #1 C-Red Clay | 1.2 (0.7) | 1.7 (0.2) |
| Comp. Ex. B | None | Carbon Black | 0 (0.2) | 0 (0.4) |
| 5-2 | of Example 3 | Carbon Black | 1.3 (0.3) | 1.4 (0.5) |

Example 6

Reaction of Poly Alpha-1,3-1,6-Glucan with Sodium Vinyl Sulfonic Acid

This example describes poly alpha-1,3-1,6-glucan functionalized with an ethylsulfonate group. Poly alpha-1,3-1,6-glucan, (20 g) is suspended in 200 mL isopropanol in a 1 L round bottom equipped with an overhead stirrer, addition funnel and nitrogen inlet. To this is added sodium vinyl sulfonic acid (187 mL of 25 wt % solution) and the mixture is stirred for 10 min. To this is added 59 g 50 wt % sodium hydroxide. The mixture is stirred for 1 hour at room temperature. The mixture is then heated to 80° C. for 5 hours with stirring. The mixture is cooled to room temperature and neutralized with 18.5 wt % HCl. The product is filtered and is purified by ultrafiltration (MWCO 5 kDa, PES membrane).

Example 7

Method for Evaluating Whiteness Benefit of Polymers (Miniwasher)

Whiteness maintenance, also referred to as whiteness preservation, is the ability of a detergent to keep white items from whiteness loss when they are washed in the presence of soils. White garments can become dirty/dingy looking over time when soils are removed from dirty clothes and suspended in the wash water, then these soils can re-deposit onto clothing, making the clothing less white each time they are washed. The whiteness benefit of polymers in this invention is evaluated using automatic Miniwasher with 5 pots. SBL2004 test soil stips supplied by WFKTestgewebe GmbH are used to simulate consumer soil levels (mix of body soil, food, dirt, grass etc.). On average, every 1 SBL2004 strip is loaded with 8 g soil. White Fabric swatches of Table 5 below purchased from WFK are used as whiteness tracers. Before wash test, L, a, b values of all whiteness tracers are measured using Konica Minolta CM-3610D spectrophotometer.

TABLE 5

Fabric SamplesCode

| | % Fiber Content | Fiber Construction | Fabric Density (g/m) | Whiteness Index (WI) A* | Whiteness Index (WI) D65** | Size |
|---|---|---|---|---|---|---|
| Cotton Terry | 100 | Woven | ~540 | ~93 | ~163 | 8" × 8" (20 × 20 cm) |
| Cotton Knit | 100 | Weft Knit | ~220 | ~96 | ~165 | 8" × 8" (20 × 20 cm) |
| Polyester/Cotton | 65/35 | Plain Woven | ~125 | ~98 | ~156 | 8" × 8" (20 × 20 cm) |
| Polyester | 100 | Weft Knit | ~200 | ~95 | ~156 | 8" × 8" (20 × 20 cm) |
| Cotton/Spandex | 98/2 | Woven Twill | ~180 | ~86 | ~158 | 8" × 8" (20 × 20 cm) |

Notes:
*WI(A) - illuminant A (indoor lighting)
**WI(D65) - illuminant D65 (outdoor lighting)

3 cycles of wash are needed to complete the test:
Cycle 1: desired amount of base detergent are fully dissolved by mixing with 7.57 L water (at defined hardness) in each Miniwasher tube. 3.5 SBL2004 strips (~28 g of soil) and 3 whiteness tracers (internal replicate) of each fabric type are the washed and rinsed in the Miniwasher under defined conditions, then dried.
Cycle 2: The above whiteness tracers are washed again with new set of SBL2004 sheet, and dried. All other conditions remain same as cycle 1.
Cycle 3: The above whiteness tracers are washed again with new set of SBL2004 sheet, and dried. All other conditions remain same as cycle 1.
After Cycle 3, all whiteness tracers are dried and then measured again using Konica Minolta CM-3610D spectrophotometer. The changes in Whiteness Index (ΔWI(CIE)) are calculated based on L, a, b measure before and after wash.

$$\Delta WI(CIE) = WI(CIE)(\text{after wash}) - WI(CIE)(\text{before wash}).$$

Miniwasher have 5 pots, 5 products can be tested in one test. In a typically polymer whiteness performance test, one reference product containing comparative polymer or no polymer are tested together with 4 products containing inventive polymers, "ΔWI versus reference" is reported $$\Delta WI(CIE) \text{ versus reference} = \Delta WI(CIE)(\text{product}) - \Delta WI(CIE)(\text{reference})$$

Polymer Performance in Liquid Base Detergent A
Liquid detergent below is prepared by traditional means know to those of ordinary skill in the art by mixing the listed ingredient.

TABLE 6

Formulations for performance test

| | Reference | Inventive Formula 1 | Inventive Formula 2 |
|---|---|---|---|
| SLE1S | 11.09 | 11.09 | 11.09 |
| Non-ionic surfactant | 7.58 | 7.58 | 7.58 |
| Amine Oxide | 1.88 | 1.88 | 1.88 |
| Fatty Acid | 2.95 | 2.95 | 2.95 |
| DTPA | 0.23 | 0.23 | 0.23 |

TABLE 6-continued

Formulations for performance test

| | Reference | Inventive Formula 1 | Inventive Formula 2 |
|---|---|---|---|
| Ethanol | 1.63 | 1.63 | 1.63 |
| NaOH (neutralizer) | 1.86 | 1.86 | 1.86 |
| 1,2 PPG (%) | 10.2 | 10.2 | 10.2 |
| Sodium tetraborate | 0.96 | 0.96 | 0.96 |
| Citric acid | 2.45 | 2.45 | 2.45 |
| Enzyme system | 0.08 | 0.08 | 0.08 |

TABLE 6-continued

Formulations for performance test

|  | Reference | Inventive Formula 1 | Inventive Formula 2 |
|---|---|---|---|
| Preservative | 0.001 | 0.001 | 0.001 |
| Perfume | 0.45 | 0.45 | 0.45 |
| Polymer of example 1 |  | 2.40 |  |
| Polymer of example 2 |  |  | 2.40 |
| Water | balance | balance | balance |

The whiteness benefit of reference 1 and Formulation 1-2 with inventive polymers are evaluated according to test procedure. The average ΔWI(CIE) versus reference of 5 fabric types are summarized in table below. Inventive polymers can deliver significant whiteness performance

TABLE 7

Whiteness performance

| Whiteness CIE vs Reference | Formula 1 | Formula 2 |
|---|---|---|
| Average | 1.43 | 1.74 |

Note:
Samples were run at a 12 minutes wash (Temperature: 87 F.), 2 minute rinse (Temperature: 59 F.); water hardness: 7 gpg. Detergent dosage: 0.73 g/L.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A product comprising a polysaccharide derivative, wherein the polysaccharide derivative comprises a polysaccharide substituted with at least one of:
   a) at least one sulfate group;
   b) at least one sulfonate group;
   c) at least one thiosulfate group; or
   d) a combination thereof;
wherein the polysaccharide is poly alpha-1,3-1,6-glucan, wherein (i) at least about 30% of the glycosidic linkages of the poly alpha-1,3-1,6-glucan are alpha-1,3 linkages, (ii) at least about 30% of the glycosidic linkages of the poly alpha-1,3-1,6-glucan are alpha-1,6 linkages, (iii) the poly alpha-1,3-1,6-glucan has a weight average degree of polymerization ($DP_w$) of at least about 10; and (iv) the alpha-1,3 linkages and alpha-1,6 linkages of the poly alpha-1,3-1,6-glucan do not consecutively alternate with each other.

2. The product of claim 1, wherein the polysaccharide is substituted with at least one sulfate group and at least one sulfonate group.

3. The product of claim 1, wherein the polysaccharide is substituted with at least one sulfonate group and at least one thiosulfate group.

4. The product of claim 1, wherein the polysaccharide derivative has a weight average degree of polymerization in the range of from about 10 to about 1400.

5. The product of claim 1, in the form of a liquid, a gel, a powder, a hydrocolloid, an aqueous solution, a granule, a tablet, a capsule, a single compartment sachet, a multi-compartment sachet, a single compartment pouch, or a multi-compartment pouch.

6. The product of claim 1, further comprising an enzyme, wherein the enzyme is a cellulase, a protease, an amylase, a lipase, or a combination thereof.

7. The product of claim 1, wherein the product is a liquid laundry detergent product, and wherein the product comprises an anionic detersive surfactant.

8. The product of claim 1, wherein the product is a water-soluble unit dose laundry detergent product in the form of a water-soluble pouch, and wherein the product comprises an anionic detersive surfactant.

9. The product of claim 1, wherein the product is a laundry powder detergent product, and wherein the product comprises an anionic detersive surfactant.

10. The product of claim 1, wherein the product is a fabric enhancer product, and wherein the product comprises a fabric-softening ingredient.

11. A product comprising a polysaccharide derivative, wherein the polysaccharide derivative comprises a polysaccharide substituted with at least one alkyl sulfonate group; wherein the polysaccharide is poly alpha-1,3-glucan, poly alpha-1,6-glucan, poly alpha-1,3-1,6-glucan, or a mixture thereof; and the polysaccharide derivative has a degree of substitution of about 0.001 to about 3, and wherein the product is a fabric care product and/or a home care product.

12. The product of claim 11, wherein the polysaccharide is poly alpha-1,6-glucan, and the poly alpha-1,6-glucan comprises a backbone of glucose monomer units wherein greater than or equal to about 40% of the glucose monomer units are linked via alpha-1,6-glycosodic linkages.

13. The product of claim 12, wherein the polysaccharide is poly alpha-1,6-glucan, and the poly alpha-1,6-glucan has a degree of alpha-1,2-branching that is less than about 50%.

14. The product of claim 11, wherein the alkyl sulfonate is ethyl sulfonate, propyl sulfonate, butyl sulfonate, or any combination thereof.

* * * * *